US012706648B2

(12) United States Patent
Li et al.

(10) Patent No.: US 12,706,648 B2
(45) Date of Patent: Aug. 11, 2026

(54) CHANNEL STATE INFORMATION REPORTING METHOD, CHANNEL STATE INFORMATION RECEIVING METHOD, COMMUNICATION NODE, AND STORAGE MEDIUM

(71) Applicant: ZTE CORPORATION, Shenzhen (CN)

(72) Inventors: Yong Li, Shenzhen (CN); Hao Wu, Shenzhen (CN); Zhaohua Lu, Shenzhen (CN); Yuxin Wang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 18/566,243

(22) PCT Filed: Jun. 21, 2022

(86) PCT No.: PCT/CN2022/100210

§ 371 (c)(1),
(2) Date: Dec. 1, 2023

(87) PCT Pub. No.: WO2023/279954

PCT Pub. Date: Jan. 12, 2023

(65) Prior Publication Data

US 2024/0259066 A1 Aug. 1, 2024

(30) Foreign Application Priority Data

Jul. 9, 2021 (CN) ........................ 202110776447.8

(51) Int. Cl.
*H04B 7/06* (2006.01)
*H04B 7/0456* (2017.01)

(52) U.S. Cl.
CPC ......... *H04B 7/0626* (2013.01); *H04B 7/0456* (2013.01); *H04B 7/0634* (2013.01)

(58) Field of Classification Search
CPC ... H04B 7/0626; H04B 7/0456; H04B 7/0634
See application file for complete search history.

(56) References Cited

U.S. PATENT DOCUMENTS

2018/0309490 A1* 10/2018 Rahman ............... H04B 7/0621
2019/0028158 A1* 1/2019 Park ..................... H04B 7/0639

(Continued)

FOREIGN PATENT DOCUMENTS

CN 108667490 A 10/2018
EP 3720009 A1 10/2020
EP 4280469 A1 11/2023

OTHER PUBLICATIONS

"3rd Generation Partnership Project; Technical Specification Group Radio Access network; NR; Physical channels and modulation (Release 16)", 3GPP TS 38.211, V16.3.0, Sep. 2020, 128 pages.

(Continued)

*Primary Examiner* — Ajay Cattungal
(74) *Attorney, Agent, or Firm* — Perkins Coie LLP

(57) ABSTRACT

In one aspect, a channel state information reporting method includes: receiving configuration information; receiving a channel state information-reference signal (CSI-RS) according to the configuration information; and reporting channel state information (CSI) according to the CSI-RS, the CSI including a precoding matrix indicator for indicating a precoding matrix, where the precoding matrix is determined (Continued)

Receive configuration information ∿110

Receive a channel state information-reference signal (CSI-RS) according to the configuration information ∿120

Report channel state information (CSI) according to the CSI-RS, the CSI including a precoding matrix indicator for indicating a precoding matrix, where the precoding matrix is determined according to a set vector, the set vector includes a first group of vectors, the first group of vectors includes $L$ first vectors, each first vector of the $L$ first vectors corresponds to a port of the CSI-RS, and $L$ is a positive integer ∿130 according to set vectors, the set vectors includes a first group of vectors, the first group of vectors includes L first vectors, each first vector of the L first vectors corresponds to a port of the CSI-RS, and L is a positive integer.

9 Claims, 2 Drawing Sheets

(56) References Cited

U.S. PATENT DOCUMENTS

| | | | | |
|---|---|---|---|---|
| 2019/0253181 | A1* | 8/2019 | Rahman | H04B 7/0626 |
| 2020/0235790 | A1 | 7/2020 | Rahman et al. | |
| 2021/0044340 | A1 | 2/2021 | Rahman et al. | |
| 2021/0175952 | A1 | 6/2021 | Wu et al. | |
| 2021/0409080 | A1 | 12/2021 | Zhang et al. | |
| 2022/0052734 | A1* | 2/2022 | Faxer | H04B 7/0478 |
| 2022/0069880 | A1* | 3/2022 | Rahman | H04B 7/0481 |
| 2022/0255609 | A1* | 8/2022 | Venkatesh | H04W 76/00 |
| 2022/0393736 | A1* | 12/2022 | Park | H04B 7/0634 |
| 2023/0022602 | A1* | 1/2023 | Zhu | H04W 72/0453 |
| 2023/0064664 | A1* | 3/2023 | Faxer | H04B 7/0645 |
| 2023/0131745 | A1* | 4/2023 | Huang | H04B 7/0623<br>375/262 |
| 2023/0224006 | A1* | 7/2023 | Faxér | H04B 7/0626<br>375/267 |
| 2024/0243867 | A1 | 7/2024 | Li et al. | |
| 2024/0356609 | A1* | 10/2024 | Park | H04B 7/0626 |

OTHER PUBLICATIONS

"3rd Generation Partnership Project; Technical Specification Group Radio Access Network; NR; Physical layer procedures for data (Release 16)", 3GPP TS 38.214, V16.3.0, Sep. 2020, 165 pages.

"3rd Generation Partnership Project; Technical Specification Group Radio Access Network; NR; Radio Resource Control (RRC) protocol specification (Release 16)", 3GPP TS 38.331, V16.3.0, Sep. 2020, 929 pages.

European Search Report issued in EP Patent Application No. 22836708.2, dated May 26, 2025, 11 pages.

Samsung, "Summary for WI: Enhancement on MIMO for NR," 3GPP TSG RAN Meeting #90-e, RP-202803, Electronic Meeting, Dec. 7-11, 2020, 10 pages.

ETSI TS 138 214 V16.5.0 (Apr. 2021), Technical Specification, 5G; NR; Physical layer procedures for data (3GPP TS 38.214 version 16.5.0 Release 16), 173 pages.

PCT International Search Report and Written Opinion (with English translations) for corresponding PCT Application No. PCT/CN2022/100210, mailed Sep. 8, 2022, 13 pages.

3GPP TSG RAN WG1 Meeting #104b-e, "RAN1 Chair's Notes", e-Meeting, Apr. 12-20, 2021, 128 pages.

3GPP TSG RAN WG1 Meeting #104e, "RAN1 Chairmans's Notes", e-Meeting, Jan. 25-Feb. 5, 2021, 158 pages.

3GPP TSG RAN WG1 Meeting #105-e, "RAN1 Chair's Notes", e-Meeting, May 10-27, 2021, 131 pages.

* cited by examiner

CHANNEL STATE INFORMATION REPORTING METHOD, CHANNEL STATE INFORMATION RECEIVING METHOD, COMMUNICATION NODE, AND STORAGE MEDIUM

CROSS-REFERENCE TO RELATED APPLICATION(S)

This application is a national phase entry under 35 USC 371 of International Patent Application No. PCT/CN2022/100210 filed on Jun. 21, 2022, the International Patent Application is filed based on Chinese Patent Application with the application No. 202110776447.8, filed on Jul. 9, 2021, and claims priority to the Chinese Patent Application, the entire contents of the International Patent Application and the Chinese Patent Application are incorporated herein by reference.

TECHNICAL FIELD

The present disclosure relates to the technical field of a wireless communication network, and for example, relates to a channel state information reporting method, a channel state information receiving method, a communication node, and a storage medium.

BACKGROUND

In a wireless communication system, a network side may determine a data transmission strategy according to channel state information (CSI) reported by a terminal, so as to select high-quality channel transmission data. On this basis, the accuracy of a channel state represented by the CSI affects the transmission strategy, and also affects the reliability and transmission efficiency of data transmission. The CSI includes a precoding matrix, and in the process of reporting the CSI with the precoding matrix, there is a lack of consideration for a relationship between a vector composition of the precoding matrix and a CSI resource port, thus CSI reporting accuracy needs to be improved.

SUMMARY

The present disclosure provides a channel state information reporting method, a channel state information receiving method, a communication node, and a storage medium, so as to improve the accuracy of reporting channel state and the reliability of communication.

Embodiments of the present disclosure provide a channel state information reporting method, including:

receiving configuration information;

receiving a channel state information-reference signal (CSI-RS) according to the configuration information; and reporting CSI according to the CSI-RS, the CSI including a precoding matrix indicator, where a precoding matrix is determined according to set vectors, the set vectors includes a first group of vectors, the first group of vectors includes L first vectors, each first vector of the L first vectors corresponds to a port of the CSI-RS, and L is a positive integer.

The embodiments of the present disclosure further provide a channel state information receiving method, including:

transmitting configuration information;

transmitting a CSI-RS according to the configuration information; and receiving CSI, the CSI including a precoding matrix indicator, where a precoding matrix is determined according to set vectors, the set vectors includes a first group of vectors, the first group of vectors includes L first vectors, each first vector corresponds to a port of the CSI-RS, and L is a positive integer.

The embodiments of the present disclosure further provide a communication node, including: a memory, a processor, and a computer program stored on the memory and runnable on the processor, where the processor, upon performing the program, implements the channel state information reporting method or the channel state information receiving method described above.

The embodiments of the present disclosure further provide a computer readable storage medium, having stored a computer program thereon, where the program, upon being executed by a processor, implements the channel state information reporting method or the channel state information receiving method described above.

DETAILED DESCRIPTION

Figures 1, 2, 3:
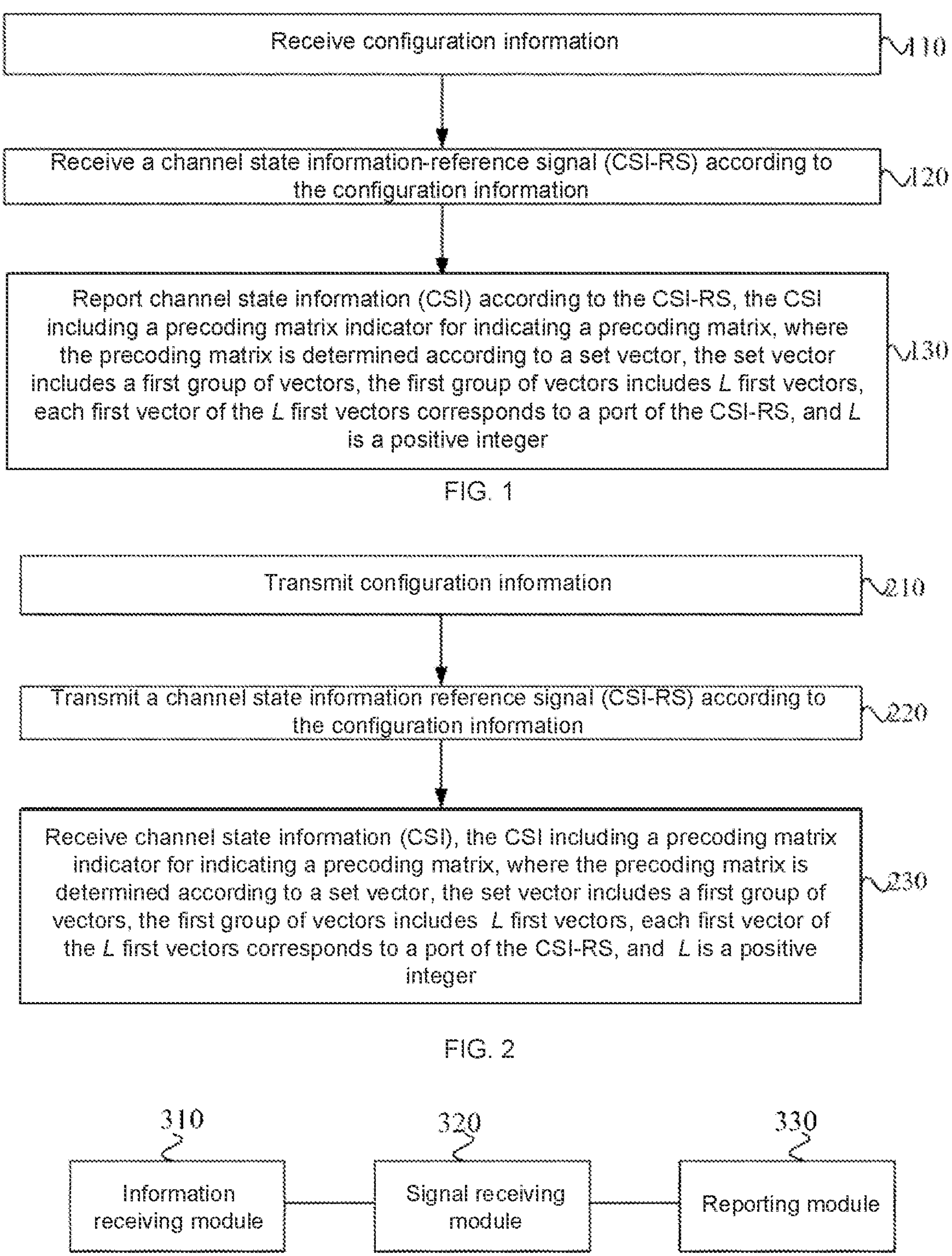
FIG. 1 is a flow chart of a channel state information reporting method provided by an embodiment.
FIG. 2 is a flow chart of a channel state information receiving method provided by an embodiment.
FIG. 3 is a structural schematic diagram of a channel state information reporting apparatus provided by an embodiment.

The present disclosure is described below in conjunction with the drawings and the embodiments. It may be understood that the specific embodiments described herein are only used to explain the present disclosure, rather than limiting the present disclosure. It should be noted that embodiments and features in the embodiments in the present disclosure may be combined with each other arbitrarily without conflict. It also should be noted that, for ease of description, only a part related to the present disclosure but not the entire structure is shown in the drawings.

The process of reporting CSI includes: a network side transmitting a CSI-RS; a terminal side providing a measurement of the CSI-RS, so as to determine the CSI between the terminal side and the network side and report the CSI to the network side; and the network side receiving the CSI and determining a transmission strategy according to the CSI. The accuracy of a channel state represented by the CSI affects the transmission strategy, and also affects the reliability and transmission efficiency of data transmission. In addition, the network side transmitting a reference signal needs to occupy a downlink resource, the terminal side uploading the CSI needs to occupy an uplink resource, and resource overhead needs to be saved as much as possible upon reporting CSI. If the system complexity increases, system operation cost and energy loss will be increased, and therefore, the complexity of reporting CSI also needs to be reduced. For the above cases, the CSI reporting method provided by this embodiment is intended to improve the accuracy of the obtained channel state, and reduce a resource overhead that is used and reduce the complexity of the system.

The embodiments of the present disclosure provide a channel state information reporting method, which may be applied to the terminal side, for example, a user equipment (UE). FIG. 1 is a flow chart of a channel state information reporting method provided by an embodiment. As shown in FIG. 1, the method provided in this embodiment includes steps 110, 120, and 130.

In step 110, configuration information is received.

In step 120, a CSI-RS is received according to the configuration information.

In step 130, CSI is reported according to the CSI-RS, the CSI including a precoding matrix indicator, where a precoding matrix is determined according to set vectors, the set vectors includes a first group of vectors, the first group of vectors includes L first vectors, each first vector of the L first vectors corresponds to a port of the CSI-RS, and L is a positive integer.

In this embodiment, the configuration information may be used to indicate a CSI-RS resource, a port corresponding to the CSI-RS resource, a mapping relationship between ports and precoding matrices, a mapping relationship between ports and first vectors, etc., and may be also used to indicate a quantity required to report the CSI by the terminal side, for example, a number L of the first vectors, coefficients forming the precoding matrix, a number of coefficients, etc. According to the configuration information, the terminal side may accurately receive the CSI-RS and perform a measurement of the CSI-RS, and then report a measurement result to the network side according to the corresponding format and content.

The CSI reported by the terminal side includes a precoding matrix indicator (PMI) for indicating a precoding matrix, the precoding matrix is determined at least according to the first group of vectors, the first group of vectors includes L first vectors, each first vector corresponds to a port of the CSI-RS. An example of one layer in the precoding matrix is: $W=W_1W_2$, W represents the precoding matrix, $W_1$ represents a matrix consisting of the first group of vectors, and $W_2$ represents coefficients used to combine the first group of vectors to form the precoding matrix, and is expressed as a matrix.

In this embodiment, the terminal side reports the CSI to the network side, based on the vector composition of the precoding matrix and the relationship between vectors and CSI resource ports, which improves the accuracy of the CSI reporting. On this basis, the precoding matrix is represented by a matrix of the first group of vectors and a matrix of first coefficients, thus complexity is low and further, resource overhead is small.

In an embodiment, the set vectors further includes a second group of vectors, the second group of vectors includes $M_v$ second vectors, each element in each second vector of the $M_v$ second vectors corresponds to a precoding matrix, and $M_v$ is a positive integer.

In this embodiment, the precoding matrix is composed of a first group of vectors and a second group of vectors, where one layer is exemplified as: $W=W_1W_2W_f$, where W represents a precoding matrix, $W_1$ represents a matrix composed of the first group of vectors, $W_f$ represents a matrix composed of the second group of vectors, $W_2$ represents coefficients of the precoding matrix used to consist of the first group of vectors and the second group of vectors, and is expressed as a matrix.

A vector in the second set of vectors is a discrete Fourier transform (DFT) vector with index number $$n_3^{(f)};$$

where an element of the DFT vector with index number $$n_3^{(f)}$$

is $$e^{j\frac{2\pi t n_3^{(f)}}{N_3}},\ \text{where } t = \{0, 1, \ldots, N_3-1\},$$

$N_3$ is a number of precoding matrices. t is an index number of an element in the DFT vector, taking the value as 0, 1, . . . , $N_3-1$. t can also represent an index number of the precoding matrix. t can also represent an index number of the frequency domain unit, and a value of t corresponds to a frequency domain unit. For example, the precoding matrix with an index number t corresponding to an element with an index number t of the DFT vector in the second group of vectors is a precoding matrix of the frequency domain unit with the index number t.

In an embodiment, the method further includes:

step 140: determining whether to report bit mapping information according to a rank of the precoding matrix; where the bit mapping information is used to indicate, in a non-zero bit, reported coefficients in first coefficients, the first coefficients including coefficients used to combine the set vectors as a precoding matrix.

In this embodiment, whether to report the bit mapping information (Bitmap) is determined according to the rank of the precoding matrix, where the bit mapping indicates, in a non-zero bit, which coefficients in the first coefficients are reported. The coefficients forming the precoding matrix are the first coefficients, for example, coefficients used to combine the first group of vectors to form the precoding matrix, such as $W_2$ described above, or coefficients used to combine the first group of vectors and the second group of vectors to form the precoding matrix, such as $W_2$ described above.

A number of layers of the precoding matrix is a rank of the precoding matrix. Reporting the bit mapping aims to indicate which coefficients in the first coefficients forming the precoding matrix are reported, thus achieving the technical effect of reporting a part of coefficients to save the resource overhead of reporting. In addition, reporting the bit mapping also needs to consume the resource overhead, and therefore, it is necessary to decide whether to report the bit mapping, so as to actually achieve the effect of saving the resource overhead, and also, reduce the complexity of the system and improve the accuracy of the reported precoding matrix.

It should be noted that, a number of the first coefficients forming the precoding matrix increases with increasing of the rank of the precoding matrix; thus, in a case where the rank is greater, reporting the bit mapping to achieve to report the smaller number of first coefficients in the coefficients forming the precoding matrix may save the resource overhead for reporting; and in a case where the rank is smaller, reporting the bit mapping to report the smaller number of coefficients in the first coefficients forming the precoding matrix, is not effective in saving the resource overhead, and even increases the resource overhead. Therefore, whether to report the bit mapping may be determined according to the rank of the precoding matrix.

For example, corresponding to the rank of the precoding matrix being 1, the bit mapping is not reported.

For another example, corresponding to the rank of the precoding matrix being 1, the bit mapping is not reported; and corresponding to the rank of the precoding matrix being greater than 1, the bit mapping is reported.

For another example, corresponding to the rank of the precoding matrix being 1, the bit mapping is not reported; corresponding to the rank of the precoding matrix being greater than 1, whether to report the bit mapping is determined according to β, where β is a parameter configured at the network side, which is used to determine an upper limit of a number of the reported coefficients.

For another example, corresponding to the rank of the precoding matrix being 1, the bit mapping is not reported; and corresponding to the rank of the precoding matrix being greater than 1, whether to report the bit mapping is determined according to $K^{NZ}$, where $K^{NZ}$ is a number of the reported coefficients, which may be reported to the network side by the terminal side.

In an embodiment, the method further includes:

step 142: determining whether to report bit mapping information according to $M_v$; where the bit mapping information is used to indicate, in a non-zero bit, reported coefficients in first coefficients, the first coefficients including coefficients used to combine the set vectors as a precoding matrix.

In this embodiment, whether to report the bit mapping is determined according to $M_v$. Also, a number of first coefficients forming the precoding matrix may also be determined according to $M_v$, e.g., $2LM_v$; the resource overhead of reporting the bit mapping may also be determined according to $M_v$, e.g., the overhead corresponding to one layer of the precoding matrix is $2LM_v$ bits; therefore, the resource overhead of reporting coefficients forming the precoding matrix without reporting the bit mapping, and the resource overhead range of reporting partial coefficients in coefficients forming the precoding matrix with reporting the bit mapping, may be determined according to $M_v$.

In an embodiment, whether to report the bit mapping may also be determined according to $M_v$ and the parameter β jointly. Also, the resource overhead of reporting coefficients forming the precoding matrix without reporting the bit mapping, and the upper limit of the resource overhead of reporting partial coefficients in coefficients forming the precoding matrix with reporting the bit mapping, may also be determined according to $M_v$ and the parameter β jointly.

In an embodiment, whether to report the bit mapping may also be determined according to $M_v$ and the $K^{NZ}$ jointly. Also, the resource overhead of reporting coefficients forming the precoding matrix without reporting the bit mapping, and the resource overhead of reporting partial coefficients in coefficients forming the precoding matrix with reporting the bit mapping, may also be determined according to $M_v$ and the $K^{NZ}$ jointly.

In an embodiment, corresponding to the rank of the precoding matrix being 1, $M_v$ is 1, the terminal may indicate which coefficients need to be reported, by means of selecting 2L ports from P CSI-RS ports, and thus may determine whether to report the bit mapping according to the rank of the precoding matrix and $M_v$ jointly.

To sum up, determining whether to report the bit mapping according to $M_v$, may include the following cases.

For example, corresponding to $M_v$ being 1, the bit mapping is not reported.

For another example, corresponding to $M_v$ being 1, the bit mapping is not reported; corresponding to $M_v$ being greater than 1, the bit mapping is reported.

For another example, corresponding to $M_v$ being 1, the bit mapping is not reported; corresponding to $M_v$ being greater than 1, whether to report the bit mapping is determined according to β.

For another example, corresponding to $M_v$ being 1, the bit mapping is not reported; corresponding to $M_v$ being greater than 1, whether to report the bit mapping is determined according to $K^{NZ}$.

For another example, corresponding to $M_v$ being 1 and the rank of the precoding matrix being 1, the bit mapping is not reported; corresponding to $M_v$ being greater than 1 or the rank of the precoding matrix being greater than 1, the bit mapping is reported.

For another example, corresponding to $M_v$ being 1 and the rank of the precoding matrix being 1, the bit mapping is not reported; corresponding to $M_v$ being greater than 1 or the rank of the precoding matrix being greater than 1, whether to report the bit mapping is determined according to β, or whether to report the bit mapping is determined according to $K^{NZ}$.

In an embodiment, the method further includes:

step 150: determining a number of reported coefficients in first coefficients according to a rank of the precoding matrix, where the first coefficients include coefficients used to combine the set vectors as a precoding matrix.

In this embodiment, a number of the reported coefficients in the coefficients forming the precoding matrix is determined according to the rank of the precoding matrix, so as to reduce the complexity of the system and simultaneously, improve the performance of the system.

For example, corresponding to the rank of the precoding matrix being 1, a number of the reported coefficients in the coefficients forming the precoding matrix is 2L.

One way is that: corresponding to the rank of the precoding matrix being 1, the terminal side and the network side determine a number of the reported coefficients in the coefficients forming the precoding matrix is 2L; and another way is that: corresponding to the rank of the precoding matrix being 1, the terminal side reports a number of the reported coefficients in the coefficients forming the precoding matrix being $K^{NZ}$, and $K^{NZ}=2L$.

For another example, corresponding to the rank of the precoding matrix being 1, a number of the reported coefficients in the coefficients forming the precoding matrix is 2L; corresponding to the rank of the precoding matrix being greater than 1, a number of the reported coefficients in the coefficients forming the precoding matrix is $K^{NZ}$.

One way is that: corresponding to the rank of the precoding matrix being 1, the terminal side and the network side determine a number of the reported coefficients in the coefficients forming the precoding matrix is 2L; corresponding to the rank of the precoding matrix being greater than 1, the terminal side reports a number of the reported coefficients in the coefficients forming the precoding matrix being $K^{NZ}$; and another way is that: corresponding to the rank of the precoding matrix being 1, the terminal side reports a number of the reported coefficients in the coefficients forming the precoding matrix being $K^{NZ}$, and $K^{NZ}$ being 2L; corresponding to the rank of the precoding matrix being greater than 1, the terminal side reports a number of the reported coefficients in the coefficients forming the precoding matrix being $K^{NZ}$.

For another example, corresponding to the rank of the precoding matrix being 1 and $M_v$ being 1, a number of the reported coefficients in coefficients forming the precoding matrix is 2L; corresponding to the rank of the precoding matrix being greater than 1 or $M_v$ being greater than 1, a number of the reported coefficients in coefficients forming the precoding matrix is $K^{NZ}$.

One way is that: corresponding to the rank of the precoding matrix being 1 and $M_v$ being 1, the terminal side and the network side determine a number of the reported coefficients in the coefficients forming the precoding matrix is 2L; corresponding to the rank of the precoding matrix being greater than 1 or $M_v$ being greater than 1, the terminal side reports a number of the reported coefficients in the coefficients forming the precoding matrix being $K^{NZ}$; and another way is that: corresponding to the rank of the precoding matrix being 1 and $M_v$ being 1, the terminal side reports a number of the reported coefficients in the coefficients forming the precoding matrix being $K^{NZ}$, and $K^{NZ}$ being 2L; corresponding to the rank of the precoding matrix being greater than 1 or $M_v$ being greater than 1, the terminal reports a number of the reported coefficients in the coefficients forming the precoding matrix being $K^{NZ}$.

As described above, a number of the reported coefficients in the coefficients forming the precoding matrix being 2L or $K^{NZ}$ may be determined according to the rank of the precoding matrix, and the determining method thereof and the determined result reduce the complexity of the system and improve the performance of the system. In an embodiment, the method further includes:

step 152: determining a number of reported coefficients in first coefficients according to $M_v$, where the first coefficients include coefficients used to combine the set vectors as a precoding matrix.

In this embodiment, a number of the reported coefficients in the coefficients forming the precoding matrix is determined according to $M_v$, so as to reduce the complexity of the system and simultaneously, improve the performance of the system.

For example, corresponding to $M_v$ being 1, a number of the reported coefficients in the coefficients forming the precoding matrix is 2L.

One way is that: corresponding to $M_v$ being 1, the terminal side and the network side determine a number of the reported coefficients in the coefficients forming the precoding matrix is 2L; and another way is that: corresponding to $M_v$ being 1, the terminal side reports a number of the reported coefficients in the coefficients forming the precoding matrix being $K^{NZ}$, and $K^{NZ}$ being 2L.

For another example, corresponding to $M_v$ being 1, a number of the reported coefficients in the coefficients forming the precoding matrix is 2L; corresponding to $M_v$ being greater than 1, a number of the reported coefficients in the coefficients forming the precoding matrix is $K^{NZ}$.

One way is that: corresponding to $M_v$ being 1, the terminal side and the network side determine a number of the reported coefficients in the coefficients forming the precoding matrix is 2L; corresponding to $M_v$ being greater than 1, the terminal side reports a number of the reported coefficients in the coefficients forming the precoding matrix being $K^{NZ}$; and another way is that: corresponding to $M_v$ being 1, the terminal side reports a number of the reported coefficients in the coefficients forming the precoding matrix being $K^{NZ}$, and $K^{NZ}$ being 2L, corresponding to $M_v$ being greater than 1, the terminal side reports a number of the reported coefficients in the coefficients forming the precoding matrix being $K^{NZ}$.

As described above, a number of the reported coefficients in the coefficients forming the precoding matrix being 2L or $K^{NZ}$ may be determined according to $M_v$, and the determining method thereof and the determined result reduce the complexity of the system and improve the performance of the system.

In an embodiment, the method further includes:

step 160: determining L according to a number of reported coefficients in first coefficients, where the first coefficients include coefficients used to combine the set vectors as a precoding matrix.

In this embodiment, the first group of vectors includes L vectors, where L is determined according to a number of reported coefficients in the first coefficient. For example, the terminal side reports a number of the reported coefficients in the coefficients forming the precoding matrix being $K^{NZ}$, then L is equal to $K^{NZ}/2$, or 2L is equal to $K^{NZ}$.

For another example, the terminal side reports a number of the reported coefficients in the coefficients forming the precoding matrix being $K^{NZ}$, then L is equal to $K^{NZ}$.

In an embodiment, the method further includes: step 162: determining L according to a rank of the precoding matrix.

In this embodiment, the first group of vectors includes L vectors, where L is determined according to the rank of the precoding matrix.

For example, corresponding to the rank of the precoding matrix being 1, $L=K^{NZ}/2$, or $2L=K^{NZ}$.

For another example, corresponding to the rank of the precoding matrix being 1, $L=K^{NZ}/2$; corresponding to the rank of the precoding matrix being 1, L is a value configured at the network side.

For another example, corresponding to the rank of the precoding matrix being 1 and $M_v$ being 1, $L=K^{NZ}/2$; corresponding to the rank of the precoding matrix being greater than 1 or $M_v$ being greater than 1, L is a value configured at the network side.

In an embodiment, the configuration information includes a CSI-RS resource, and a number of antenna ports of the CSI-RS resource is P;

the method further includes: step 170: selecting 2L antenna ports from P antenna ports and reporting the 2L antenna ports; the 2L antenna ports are mapped to L first vectors.

In this embodiment, the network side configures the parameter L and the CSI-RS resource to the terminal side, where a number of ports of the CSI-RS resource is P; the terminal selects 2L ports from P CSI-RS ports, where L ports are selected in each polarization direction; each port of the L ports is mapped to a first vector in the first group of vectors.

The way of a port with a sequence number being $m_i$ mapped to a first vector $v_{m_i}$ is that: $v_{m_i}$ is a vector including P/2 elements, where a ($m_i$ mod P/2)-th element is 1 and the remaining elements are 0; where mod represents a modular operation, $m_i$ represents a dividend, P/2 represents a divisor; the first element is a 0-th element. P being 8 and $m_i$ being 2 are taken as an example $v_2=[0, 0, 1, 0]^T$; where T represents a transposition.

An example of L vectors consisting of $W_1$, $$W_1 = \begin{bmatrix} v_{m_0} & v_{m_1} & \dots & v_{m_{L-1}} & O & O & O & O \\ O & O & O & O & v_{m_0} & v_{m_1} & \dots & v_{m_{L-1}} \end{bmatrix}$$

where O represents a vector that contains P/2 elements and of which all elements are 0.

Let a second vector in the second group of vectors be $y^{(f)}$, where f=0, 1, . . . , $M_v-1$; for example, $M_v$ vectors in the second group of vectors are $y^{(0)}$, $y^{(1)}$, . . . , $y^{(M_v-1)}$, and are row vectors. In an example of the $M_v$ vectors in the second group of vectors consisting of $W_f$, $$W_f = \begin{bmatrix} y^{(0)} \\ y^{(1)} \\ \vdots \\ y^{(M_v-1)} \end{bmatrix}.$$

In a case where the precoding matrix consists of only the first group of vectors, an example of one layer of the precoding matrix is: $W=W_1W_2$, where W represents the precoding matrix; $W_1$ represents a matrix consisting of the first group of vectors, the dimension of $W_1$ is P×2L, that is, a first dimension is P and a second dimension is 2L; $W_2$ represents coefficients used to combine the first group of vectors to form the precoding matrix, and is expressed as a matrix, the dimension of $W_2$ is 2L×1, that is, a first dimension is 2L and a second dimension is 1; that is, a number of elements included in $W_2$ is 2L, i.e., a number of coefficients forming one layer of the precoding matrix is 2L.

In a case where the precoding matrix consists of the first group of vectors and the second group of vectors, an example of one layer of the precoding matrix is: $W=W_1W_2W_f$, where W represents the precoding matrix; $W_1$ represents a matrix consisting of the first group of vectors, the dimension of $W_1$ is P×2L, that is, a first dimension is P and a second dimension is 2L; $W_f$ represents a matrix consisting of the second group of vectors, the dimension of $W_f$ is $M_v \times N_3$, that is, a first dimension is $M_v$, a second dimension is $N_3$; $W_2$ represents coefficients used to combine the first group of vectors and the second group of vectors to form the precoding matrix, and is expressed as a matrix, the dimension of $W_2$ is $2L \times M_v$, that is, a first dimension is 2L and a second dimension is $M_v$; that is, a number of elements included in $W_2$ is 2 $LM_v$, i.e., a number of coefficients forming one layer of the precoding matrix is $2LM_v$.

In an embodiment, L is determined according to one of: a rank of the precoding matrix; $M_v$; the rank of the precoding matrix and $M_v$.

In this embodiment, the configuration information includes the CSI-RS resource, where a number of antenna ports of the CSI-RS resource is P, the terminal selects 2L antenna ports from P antenna ports, and reports the selected antenna ports, the selected antenna ports are mapped to the first group of vectors. L is determined according to one way of:

1) L being determined according to the rank of the precoding matrix;
2) L being determined according to $M_v$;
3) L being determined according to the rank of the precoding matrix and $M_v$ jointly.

For example, corresponding to the rank of the precoding matrix being 1, $L=K^{NZ}/2$, or $2L=K^{NZ}$.

For another example, corresponding to the rank of the precoding matrix being 1, $L=K^{NZ}/2$; corresponding to the rank of the precoding matrix being greater than 1, L is a value configured at the network side.

For another example, corresponding to $M_v$ being 1, $L=K^{NZ}/2$; corresponding to $M_v$ being greater than 1, L is a value configured at the network side.

For another example, corresponding to the rank of the precoding matrix being 1 and $M_v$ being 1, $L=K^{NZ}/2$; corresponding to the rank of the precoding matrix being greater than 1 or $M_v$ being greater than 1, L is a value configured at the network side.

In an embodiment, overhead occupied by reporting a number of reported coefficients in first coefficients is $\lceil \log_2(4L) \rceil$ bits or $2+\lceil \log_2(L) \rceil$ bits, where the first coefficients include coefficients used to combine the set vectors as a precoding matrix.

In this embodiment, the terminal side reports a number of the reported coefficients in the coefficients forming the precoding matrix being $K^{NZ}$, where the overhead for reporting $K^{NZ}$ is $\lceil \log_2(4L) \rceil$, or $2+\lceil \log_2(L) \rceil$. It should be noted that, $\lceil\ \rceil$ represents rounding up. That is, the overhead for reporting $K^{NZ}$ is designed as a linear function of the logarithm of the number L of vectors included in the first group of vectors, thereby saving the overhead and reducing the system complexity.

In an embodiment, for first coefficients forming one layer of the precoding matrix, a number of reported coefficients does not exceed $K_0$;

for first coefficients forming each layer of the precoding matrix, a number of reported coefficients does not exceed 2 $K_0$; where $K_0=\lceil 2LM_v\beta \rceil$, β is a positive number less than or equal to 1.

In this embodiment, in order to save the overhead of reporting the precoding matrix indicator at the terminal side, the terminal side may report only a part of the coefficients forming the precoding matrix; for example, the base station configures a parameter β to the terminal, for determining a parameter $K_0$, $K_0=\lceil 2LM_v\beta \rceil$, where β is a positive number less than or equal to 1; for the coefficients forming one layer of the precoding matrix, the number of coefficients reported to the base station by the terminal does not exceed $K_0$; for the coefficients forming all layers of the precoding matrix, the number of coefficients reported to the base station by the terminal does not exceed $2K_0$ in total. In order to enable the base station to receive the reported coefficients, the terminal also reports a number $K^{NZ}$ of the reported coefficients to the base station, and reports the bit mapping, so as to indicate, in a non-zero bit of the bit mapping, which coefficients in the coefficients forming the precoding matrix are reported.

In addition, an upper limit of a number of the reported coefficients is determined according to the parameter β and the rank of the precoding matrix jointly, and correspondingly, β may be used to determine partial coefficients in the coefficients forming the precoding matrix, reported by adopting to report the bit mapping under different ranks, thereby saving the lower limit of the resource overhead. On this basis, whether to report the bit mapping may be determined according to the rank of the precoding matrix and the parameter β jointly.

In addition, through $K^{NZ}$ and the rank of the precoding matrix, partial coefficients in the coefficients forming the precoding matrix, reported by adopting to report the bit mapping may be calculated, thereby saving the resource overhead. On this basis, whether to report the bit mapping may be determined according to the rank of the precoding matrix and $K^{NZ}$ jointly.

In an embodiment, the configuration information includes L, $M_v$, and β; L, $M_v$, and β meet one of associated relationships of:

1) corresponding to $M_v$ being 1, β being 1;
2) corresponding to $M_v$ being 1, β being 1, and corresponding to $M_v$ being greater than 1, β being less than 1;

3) corresponding to $M_\nu$ being 1, $\beta$ being 1, and corresponding $M_\nu$ being greater than 1, $\beta$ being less than or equal to 1;

4) corresponding to $M_\nu$ being greater than 1, a value of $\beta$ being determined according to L;

5) corresponding to $M_\nu$ being greater than 1, if a value of L being greater, then a value of $\beta$ being smaller, and if a value of L being smaller, then a value of $\beta$ being greater;

6) corresponding to $M_\nu$ being greater than 1, candidate values of L being divided into multiple sets according to candidate values of $\beta$, where elements of different sets are different;

7) corresponding to $M_\nu$ being greater than 1, each candidate value of L corresponding to one candidate value of $\beta$;

8) corresponding to $M_\nu$ being greater than 1, a candidate value of $\beta$ and a candidate value of L meeting one of: corresponding to L=8, $\beta$=½, corresponding to L=6, $\beta$=½, corresponding to L=4, $\beta$=¾, corresponding to L=2, $\beta$=¾, corresponding to L=1, $\beta$=¾;

9) candidate values of L being divided into a first set of candidate values of L and a second set of candidate values of L, candidate values of $\beta$ forming a first set of candidate values of $\beta$ and a second set of candidate values of $\beta$, the first set of candidate values of $\beta$ corresponding to the first set of candidate values of L, the second set of candidate values of $\beta$ corresponding to the second set of candidate values of L, where the first set of candidate values of $\beta$ is different from the second set of candidate values of $\beta$;

10) candidate values of L being divided into a first set of candidate values of L and a second set of candidate values of L, candidate values of $\beta$ forming a first set of candidate values of $\beta$ and a second set of candidate values of $\beta$, the first set of candidate values of $\beta$ corresponding to the first set of candidate values of L, the second set of candidate values of $\beta$ corresponding to the second set of candidate values of L, where the first set of candidate values of $\beta$ is a subset of the second set of candidate values of $\beta$, and the first set of candidate values of $\beta$ is different from the second set of candidate values of $\beta$;

11) corresponding to L being 16, $\beta$ being 1;

12) corresponding to L being 12, $\beta$ being 1;

13) candidate values of $M_\nu$ being divided into a first set of candidate values of $M_\nu$ and a second set of candidate values of $M_\nu$, candidate values of $\beta$ being divided into a first set of candidate values of $\beta$ and a second set of candidate values of $\beta$, the first set of candidate values of $\beta$ corresponding to the first set of candidate values of $M_\nu$, the second set of candidate values of $\beta$ corresponding to the second set of candidate values of $M_\nu$;

14) candidate values of $M_\nu$ being divided into a first set of candidate values of $M_\nu$ and a second set of candidate values of $M_\nu$, candidate values of $\beta$ forming a first set of candidate values of $\beta$ and a second set of candidate values of $\beta$, the first set of candidate values of $\beta$ corresponding to the first set of candidate values of $M_\nu$, the second set of candidate values of $\beta$ corresponding to the second set of candidate values of $M_\nu$, where the first set of candidate values of $\beta$ is different from the second set of candidate values of $\beta$;

15) candidate values of $M_\nu$ being divided into a first set of candidate values of $M_\nu$ and a second set of candidate values of $M_\nu$, candidate values of $\beta$ forming a first set of candidate values of $\beta$ and a second set of candidate values of $\beta$, the first set of candidate values of $\beta$ corresponding to the first set of candidate values of $M_\nu$, the second set of candidate values of $\beta$ corresponding to the second set of candidate values of $M_\nu$, where the first set of candidate values of $\beta$ is a subset of the second set of candidate values of $\beta$, and the first set of candidate values of $\beta$ is different from the second set of candidate values of $\beta$;

16) candidate values of $M_\nu$ being divided into a first set of candidate values of $M_\nu$ and a second set of candidate values of $M_\nu$, candidate values of L being divided into a first set of candidate values of L and a second set of candidate values of L, the first set of candidate values of L corresponding to the first set of candidate values of $M_\nu$, the second set of candidate values of L corresponding to the second set of candidate values of $M_\nu$;

17) candidate values of $M_\nu$ being divided into a first set of candidate values of $M_\nu$ and a second set of candidate values of $M_\nu$, candidate values of L forming a first set of candidate values of L and a second set of candidate values of L, the first set of candidate values of L corresponding to the first set of candidate values of $M_\nu$, the second set of candidate values of L corresponding to the second set of candidate values of $M_\nu$, where the first set of candidate values of L is different from the second set of candidate values of L;

18) candidate values of $M_\nu$ being divided into a first set of candidate values of $M_\nu$ and a second set of candidate values of L, candidate values of L forming a first set of candidate values of L and a second set of candidate values of L, the first set of candidate values of L corresponding to the first set of candidate values of $M_\nu$, the second set of candidate values of L corresponding to the second set of candidate values of $M_\nu$, where the first set of candidate values of L is a subset of the second set of candidate values of L, and the first set of candidate values of L is different from the second set of candidate values of L;

19) candidate values of L being divided into a first set of candidate values of L and a second set of candidate values of L, candidate values of $M_\nu$ forming a first set of candidate values of $M_\nu$ and a second set of candidate values of $M_\nu$, the first set of candidate values of $M_\nu$ corresponding to the first set of candidate values of L, the second set of candidate values of $M_\nu$ corresponding to the second set of candidate values of L, where the first set of candidate values of $M_\nu$ is different from the second set of candidate values of $M_\nu$;

20) candidate values of L being divided into a first set of candidate values of L and a second set of candidate values of L, candidate values of $M_\nu$ forming a first set of candidate values of $M_\nu$ and a second set of candidate values of $M_\nu$, the first set of candidate values of $M_\nu$ corresponding to the first set of candidate values of L, the second set of candidate values of $M_\nu$ corresponding to the second set of candidate values of L, where the first set of candidate values of $M_\nu$ is a subset of the second set of candidate values of $M_\nu$, and the first set of candidate values of $M_\nu$ is different from the second set of candidate values of $M_\nu$;

21) corresponding to L being 16, $M_\nu$ being 1;

22) corresponding to L being 12, $M_\nu$ being 1.

In this embodiment, in the configuration information, L, $M_\nu$, and $\beta$ are configured; the parameter $K_0$ may be determined according to L, $M_\nu$, and $\beta$, $K_0=\lceil 2LM_\nu\beta \rceil$, where $\beta$ is a positive number less than or equal to 1; for the coefficients forming one layer of precoding matrix, a number of coefficients reported to the network side by the terminal side does not exceed $K_0$; for the coefficients forming all layers of precoding matrix, a number of coefficients reported to the network side by the terminal side does not exceed $2K_0$ in total.

Table 1 to table 4 show an associated relationship of a candidate value of L, a candidate value of $M_v$, and a candidate value of β, respectively.

TABLE 1 an associated relationship of a candidate value of L, a candidate value of $M_v$, and a candidate value of β

| $M_v = 1$ | | $M_v > 1$ | |
|---|---|---|---|
| L | β | L | β |
| 1 | 1 | 1 | 3/4 |
| 2 | 1 | 2 | 3/4 |
| 4 | 1 | 4 | 3/4 |
| 6 | 1 | 6 | 1/2 |
| 8 | 1 | 8 | 1/2 |
| 12 | 1 | | |
| 16 | 1 | | |

TABLE 2 another associated relationship of a candidate value of L, a candidate value of $M_v$, and a candidate value of β

| $M_v = 1$ | | $M_v = 2$ | |
|---|---|---|---|
| L | β | L | β |
| 1 | 1 | 1 | 3/4 |
| 2 | 1 | 2 | 3/4 |
| 4 | 1 | 4 | 3/4 |
| 6 | 1 | 6 | 1/2 |
| 8 | 1 | 8 | 1/2 |
| 12 | 1 | | |
| 16 | 1 | | |

TABLE 3 yet another associated relationship of a candidate value of L, a candidate value of $M_v$, and a candidate value of β

| $M_v = 1$ | | $M_v > 1$ | |
|---|---|---|---|
| L | β | L | β |
| 12 | 1 | 1 | 3/4 |
| 16 | 1 | 2 | 3/4 |
| | | 4 | 3/4 |
| | | 6 | 1/2 |
| | | 8 | 1/2 |

TABLE 4 still another associated relationship of a candidate value of L, a candidate value of $M_v$, and a candidate value of β

| $M_v = 1$ | | $M_v = 2$ | |
|---|---|---|---|
| L | β | L | β |
| 12 | 1 | 1 | 3/4 |
| 16 | 1 | 2 | 3/4 |
| | | 4 | 3/4 |
| | | 6 | 1/2 |
| | | 8 | 1/2 |

For another example, candidate values of L are divided into a first set {12, 16} of candidate values of L and a second set {1, 2, 4, 6, 8} of candidate values of L; candidate values of β are divided into a first set {1} of candidate values of β and a second set {½, ¾} of candidate values of β; the first set {1} of candidate values of β corresponds to the first set {12, 16} of candidate values of L and the second set {1, 2, 4, 6, 8} of candidate values of L; the second set {½, ¾} of candidate values of β corresponds to the second set {1, 2, 4, 6, 8} of candidate values of L.

For another example, candidate values of L are divided into a first set {12, 16} of candidate values of L and a second set {1, 2, 4, 6, 8} of candidate values of L; candidate values of β are divided into a first set {1} of candidate values of β and a second set {¼, ½, ¾} of candidate values of β; the first set {1} of candidate values of β corresponds to the first set {12, 16} of candidate values of L and the second set {1, 2, 4, 6, 8} of candidate values of L; the second set {¼, ½, ¾} of candidate values of β corresponds to the second set {1, 2, 4, 6, 8} of candidate values of L.

For another example, candidate values of L are divided into a first set {12, 16} of candidate values of L and a second set {1, 2, 4, 6, 8} of candidate values of L; candidate values of β form a first set {1} of candidate values of β and a second set {½, ¾, 1} of candidate values of 6; the first set {1} of candidate values of β corresponds to the first set {12, 16} of candidate values of L and the second set {1, 2, 4, 6, 8} of candidate values of L; the second set {½, ¾, 1} of candidate values of β corresponds to the second set {1, 2, 4, 6, 8} of candidate values of L.

For another example, candidate values of L are divided into a first set {12, 16} of candidate values of L and a second set {1, 2, 4, 6, 8} of candidate values of L; candidate values of β form a first set {1} of candidate values of β and a second set {¼, ½, ¾, 1} of candidate values of B; the first set {1} of candidate values of β corresponds to the first set {12, 16} of candidate values of L and the second set {1, 2, 4, 6, 8} of candidate values of L; the second set {¼, ½, ¾, 1} of candidate values of corresponds to the second set {1, 2, 4, 6, 8} of candidate values of L.

For another example, corresponding to $M_v$ being 1, 6 is 1; corresponding to $M_v$ being greater than 1, candidate values of β is {½, ¾}.

For another example, corresponding to $M_v$ being 1, β is 1; corresponding to $M_v$ being greater than 1, candidate values of β is {¼, ½, ¾}.

For another example, corresponding to $M_v$ being 1, 6 is 1; corresponding to $M_v$ being greater than 1, candidate values of β is {½, ¾, 1}.

For another example, corresponding to $M_v$ being 1, β is 1; corresponding to $M_v$ being greater than 1, candidate values of β is {¼, ½, ¾, 1}.

For another example, corresponding to $M_v$ being 1, β is 1; corresponding to $M_v$ being 2, candidate values β of is {½, ¾}.

For another example, corresponding to $M_\nu$ being 1, 6 is 1; corresponding to $M_\nu$ being 2, candidate values of $\beta$ is {¼, ½, ¾}.

For another example, corresponding to $M_\nu$ being 1, $\beta$ is 1; corresponding to $M_\nu$ being 2, candidate values of $\beta$ is {½, ¾, 1}.

For another example, corresponding to $M_\nu$ being 1, 6 is 1; corresponding to $M_\nu$ being 2, candidate values of $\beta$ is {¼, ½, ¾, 1}.

For another example, corresponding to $M_\nu$ being 1, $\beta$ is 1; corresponding to $M_\nu$ being 2, 6 is smaller than 2.

For another example, corresponding to $M_\nu$ being 1, $\beta$ is 1; corresponding to $M_\nu$ being 2, $\beta$ is less than or equal to 2.

It should be noted that, the candidate values of the above parameters have the above correlation, so that the configured parameters can be matched, thereby improving the performance of the system, and may reduce a number of combinations of these parameters, thereby reducing the complexity of the system.

In an embodiment, the configuration information includes P and $M_\nu$, where P is a number of antenna ports of a CSI-RS resource;

P and $M_\nu$ meet one of the associated relationships of:

1) corresponding to P being greater than or equal to a first threshold value, $M_\nu$ being less than or equal to a second threshold value, and corresponding to P being less than the first threshold value, $M_\nu$ greater than being the second threshold value;
2) corresponding to P being greater than a first threshold value, $M_\nu$ being less than a second threshold value, and corresponding to P being less than or equal to the first threshold value, $M_\nu$ being greater than or equal to the second threshold value;
3) candidate values of P being divided into a first set of candidate values of P and a second set of candidate values of P, candidate values of $M_\nu$ being divided into a first set of candidate values of $M_\nu$ and a second set of candidate values of $M_\nu$, the first set of candidate values of $M_\nu$ corresponding to the first set of candidate values of P, the second set of candidate values of $M_\nu$ corresponding to the second set of candidate values of P;
4) candidate values of P being divided into a first set of candidate values of P and a second set of candidate values of P, candidate values of $M_\nu$ being divided into a first set of candidate values of $M_\nu$ and a second set of candidate values of $M_\nu$, the first set of candidate values of $M_\nu$ corresponding to the first set of candidate values of P and the second set of candidate values of P respectively, the second set of candidate values of $M_\nu$ corresponding to the second set of candidate values of P;
5) candidate values of P being divided into a first set of candidate values of P and a second set of candidate values of P, candidate values of $M_\nu$ forming a first set of candidate values of $M_\nu$ and a second set of candidate values of $M_\nu$, the first set of candidate values of $M_\nu$ corresponding to the first set of candidate values of P, the second set of candidate values of $M_\nu$ corresponding to the second set of candidate values of P, where the first set of candidate values of $M_\nu$ is different from the second set of candidate values of $M_\nu$;
6) candidate values of P being divided into a first set of candidate values of P and a second set of candidate values of P, candidate values of $M_\nu$ forming a first set of candidate values of $M_\nu$ and a second set of candidate values of $M_\nu$, the first set of candidate values of $M_\nu$ corresponding to the first set of candidate values of P, the second set of candidate values of $M_\nu$ corresponding to the second set of candidate values of P, where the first set of candidate values of $M_\nu$ is a subset of the second set of candidate values of $M_\nu$, and the first set of candidate values of $M_\nu$ is different from the second set of candidate values of $M_\nu$;
7) corresponding to P being 32, $M_\nu$ being 1;
8) corresponding to P being 24, $M_\nu$ being 1.

In this embodiment, the configuration information includes the CSI-RS resource, where a number of antenna ports of the CSI-RS resource is P, the terminal selects 2L antenna ports from P antenna ports, and reports the selected antenna ports, the selected antenna ports are mapped to the first group of vectors; P and $M_\nu$ are configured, candidate values of P and candidate values of $M_\nu$ have one of the following correlations.

For example, corresponding to P being greater than or equal to 24, $M_\nu$ is less than or equal to 2; corresponding to P being less than 24, $M_\nu$ is greater than 2.

For another example, corresponding to P being greater than or equal to 16, $M_\nu$ is less than or equal to 2; corresponding to P being less than 16, $M_\nu$ is greater than 2.

For example, corresponding to P being greater than 24, $M_\nu$ is less than 2; corresponding to P being less than or equal to 24, $M_\nu$ is greater than or equal to 2.

For another example, corresponding to P being greater than 16, $M_\nu$ is less than 2; corresponding to P being less than or equal to 16, $M_\nu$ is greater than or equal to 2.

For another example, candidate values of P are divided into a first set {24, 32} of candidate values of P and a second set {2, 4, 8, 12, 16} of candidate values of P; candidate values of $M_\nu$ are divided into a first set {1} of candidate values of $M_\nu$ and a second set {2} of candidate values of $M_\nu$; the first set {1} of candidate values of $M_\nu$ corresponds to the first set {24, 32} of candidate values of P, the second set {2} of candidate values of $M_\nu$ corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of $M_\nu$ are divided into a first set {1} of candidate values of $M_\nu$ and a second set {2} of candidate values of $M_\nu$; the first set {1} of candidate values of $M_\nu$ corresponds to the first set {24, 32} of candidate values of P and the second set {2, 4, 8, 12, 16} of candidate values of P, the second set {2} of candidate values of $M_\nu$ corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of $M_\nu$ form a first set {1} of candidate values of $M_\nu$ and a second set {1, 2} of candidate values of $M_\nu$; the first set {1} of candidate values of $M_\nu$ corresponds to the first set {24, 32} of candidate values of P and the second set {2, 4, 8, 12, 16} of candidate values of P, the second set {1, 2} of candidate values of $M_\nu$ corresponds to the second set {2, 4, 8, 12, 16} of candidate values of P.

It should be noted that, the candidate values of the above parameters have the above correlation, so that the configured parameters can be matched, thereby improving the performance of the system, and may reduce a number of combinations of these parameters, thereby reducing the complexity of the system.

In an embodiment, the configuration information includes P and $\beta$, where P is a number of antenna ports of a CSI-RS resource;

P and β meet one of the associated relationships of:

1) corresponding to P being greater than or equal to a first threshold value, β being greater than or equal to a second threshold value, and corresponding to P being less than the first threshold value, β being less than the second threshold value;
2) corresponding to P being greater than a first threshold value, β being greater than a second threshold value, and corresponding to P being less than or equal to the first threshold value, β being less than or equal to the second threshold value;
3) candidate values of P being divided into a first set of candidate values of P and a second set of candidate values of P, candidate values of β being divided into a first set of candidate values of β and a second set of candidate values of β, the first set of candidate values of β corresponding to the first set of candidate values of P, the second set of candidate values of β corresponding to the second set of candidate values of P;
4) candidate values of P being divided into a first set of candidate values of P and a second set of candidate values of P, candidate values of β being divided into a first set of candidate values of β and a second set of candidate values of β, the first set of candidate values of β corresponding to the first set of candidate values of P and the second set of candidate values of P respectively, the second set of candidate values of β corresponding to the second set of candidate values of P;
5) candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is different from the second set of candidate values of β;
6) candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is a subset of the second set of candidate values of β, and the first set of candidate values of β is different from the second set of candidate values of β;
7) corresponding to P being 32, β being 1;
8) corresponding to P being 24, β being 1.

In this embodiment, the configuration information includes the CSI-RS resource, where a number of antenna ports of the CSI-RS resource is P, the terminal selects 2L antenna ports from P antenna ports, and reports the selected antenna ports, the selected antenna ports are mapped to the first group of vectors; the parameter $K_0$ is determined according to L, $M_v$ and β, $K_0=\lceil 2LM_v\beta \rceil$, where β is a positive number less than or equal to 1; for the coefficients forming one layer of the precoding matrix, a number of coefficients reported to the network side by the terminal side does not exceed $K_0$; for the coefficients forming all layer of the precoding matrix, a number of coefficients reported to the network side by the terminal side does not exceed $2K_0$ in total.

For example, corresponding to P being greater than or equal to 24, β is greater than or equal to 1; corresponding to P being less than 24, β is less than 1.

For another example, corresponding to P being greater than or equal to 16, β is greater than or equal to 1; corresponding to P being less than 16, β is less than 1.

For example, corresponding to P being greater than 24, β is greater than ¾; corresponding to P being less than or equal to 24, β is less than or equal to ¾.

For another example, corresponding to P being greater than 16, β is greater than ¾; corresponding to P being less than or equal to 16, β is less than or equal to ¾.

For another example, candidate values of P are divided into a first set {24, 32} of candidate values of P and a second set {2, 4, 8, 12, 16} of candidate values of P; candidate values of β are divided into a first set {1} of candidate values of β and a second set {½, ¾} of candidate values of B; the first set {1} of candidate values of β corresponds to the first set {24, 32} of candidate values of P, the second set {½, ¾} of candidate values of β corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of β are divided into a first set {1} of candidate values of β and a second set {¼, ½, ¾} of candidate values of 6; the first set {1} of candidate values of β corresponds to the first set {24, 32} of candidate values of P, the second set {¼, ½, ¾} of candidate values of β corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of β are divided into a first set {1} of candidate values of β and a second set {½, ¾} of candidate values of B; the first set {1} of candidate values of B corresponds to the first set {24, 32} of candidate values of P and the second set {2, 4, 8, 12, 16} of candidate values of P, the second set {½, ¾} of candidate values of β corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of β are divided into a first set {1} of candidate values of β and a second set {¼, ½, ¾} of candidate values of β; the first set {1} of candidate values of β corresponds to the first set {24, 32} of candidate values of P and the second set {2, 4, 8, 12, 16} of candidate values of P, the second set {¼, ½, ¾} of candidate values of β corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of β form a first set {1} of candidate values of β and a second set {½, ¾, 1} of candidate values of 6; the first set {1} of candidate values of β corresponds to the first set {24, 32} of candidate values of P and the second set {2, 4, 8, 12, 16} of candidate values of P, the second set {½, ¾, 1} of candidate values of β corresponds to the second set {2, 4, 8, 12, 16} of candidate values of P.

For another example, candidate values of P are divided into a first set {24, 32} of candidate values of P and a second set {2, 4, 8, 12, 16} of candidate values of P; candidate values of β form a first set {1} of candidate values of β and a second set {¼, ½, ¾, 1} of candidate values of β; the first set {1} of candidate values of β corresponds to the first set {24, 32} of candidate values of P and the second set {2, 4, 8, 12, 16} of candidate values of P, the second set {¼, ½, ¾, 1} of candidate values of β corresponds to the second set {2, 4, 8, 12, 16} of candidate values of P.

It should be noted that, the candidate values of the above parameters have the above correlation, so that the configured parameters can be matched, thereby improving the performance of the system, and may reduce a number of combinations of these parameters, thereby reducing the complexity of the system.

In an embodiment, the configuration information includes a combination parameter C, the combination parameter C is used to indicate L, $M_v$, and β;

P, C, L, $M_v$, and β meet one of the associated relationships of:

1) L, $M_v$ and β indicated by the combination parameter being determined according to P;

2) a value range of the combination parameter being determined according to P;

3) a value of L increasing with increasing of a value of the combination parameter;

4) candidate values of P being divided into a first set of candidate values of P and a second set of candidate values of P; corresponding to the first set of candidate values of P, a value of the combination parameter C indicating a first combination of a value of L, a value of $M_v$, and a value of, and corresponding to the second set of candidate values of P, a value of the combination parameter C indicating a second combination of a value of L, a value of $M_v$, and a value of β, the first combination being different from the second combination;

5) candidate values of P being divided into a first set of candidate values of P and a second set of candidate values of P, candidate values of C forming a first set of candidate values of C and a second set of candidate values of C, the first set of candidate values of C corresponding to the first set of candidate values of P, the second set of candidate values of C corresponding to the second set of candidate values of P, the first set of candidate values of C being different from the second set of candidate values of C.

In this embodiment, in the configuration information, the CSI-RS resource is configured, where a number of antenna ports of the CSI-RS resource is P, the terminal selects 2L antenna ports from P antenna ports, and reports the selected antenna ports, the selected antenna ports are mapped to the first group of vectors; the parameter $K_0$ is determined according to L, $M_v$ and β, $K_0=\lceil 2LM_v\beta \rceil$, where β is a positive number less than or equal to 1; for the coefficients forming one layer of the precoding matrix, a number of coefficients reported to the base station by the terminal does not exceed $K_0$; for the coefficients forming all layers of the precoding matrix, a number of coefficients reported to the base station by the terminal does not exceed $2K_0$ in total; in the configuration information, L, $M_v$ and β are configured by using the combination parameter C, that is, a value of the combination parameter C indicates a value of L, a value of $M_v$ and a value of β.

Table 5 to table 7 show associated relationships of a candidate value of C, a candidate value of P, a candidate value of L, a candidate value of $M_v$ and a candidate value of β, respectively, where table 6 corresponds to P being 24, 32; table 7 corresponds to P being less than 24.

TABLE 5 an associated relationship of a candidate value of C, a candidate value of P, a candidate value of L, a candidate value of $M_v$ and a candidate value of β

| Combination parameter | P = 24, 32 | | | P < 24 | | |
|---|---|---|---|---|---|---|
| C | L | $M_v$ | β | L | $M_v$ | β |
| 1 | 1 | 1 | 1 | 1 | 2 | 3/4 |
| 2 | 2 | 1 | 1 | 2 | 2 | 3/4 |
| 3 | 4 | 1 | 1 | 4 | 2 | 3/4 |
| 4 | 6 | 1 | 1 | 6 | 2 | 1/2 |
| 5 | 8 | 1 | 1 | 8 | 2 | 1/2 |
| 6 | 12 | 1 | 1 | | | |
| 7 | 16 | 1 | 1 | | | |

As shown in table 5, corresponding to P being 24, 32, a combination of a value of L, a value of $M_v$ and a value of β indicated by a value 1 of C is (1, 1, 1); corresponding to P being less than 24, a combination of a value of L, a value of $M_v$ and a value of β indicated by a value 1 of C is (1, 2, ¾).

TABLE 6 another associated relationship of a candidate value of C, a candidate value of P, a candidate value of L, a candidate value of $M_v$ and a candidate value of β

| Combination parameter | P = 24, 32 | | |
|---|---|---|---|
| C | L | $M_v$ | β |
| 1 | 1 | 1 | 1 |
| 2 | 2 | 1 | 1 |
| 3 | 4 | 1 | 1 |
| 4 | 6 | 1 | 1 |
| 5 | 8 | 1 | 1 |
| 6 | 12 | 1 | 1 |
| 7 | 16 | 1 | 1 |

TABLE 7 yet another associated relationship of a candidate value of C, a candidate value of P, a candidate value of L, a candidate value of $M_v$ and a candidate value of β

| Combination parameter | P < 24 | | |
|---|---|---|---|
| C | L | $M_v$ | β |
| 1 | 1 | 2 | 3/4 |
| 2 | 2 | 2 | 3/4 |
| 3 | 4 | 2 | 3/4 |
| 4 | 6 | 2 | 1/2 |
| 5 | 8 | 2 | 1/2 |

The embodiment of the present disclosure further provides a channel state information receiving method, the method may be applied to the network side, for example, a base station. It should be noted that, technical details not fully described in this embodiment may refer to any of the above embodiments.

FIG. 2 is a flow chart of a channel state information receiving method provided by an embodiment. As shown in FIG. 2, the method provided in this embodiment includes steps 210, 220, and 230.

In step 210, configuration information is transmitted.

In step 220, a channel state information-reference signal (CSI-RS) is transmitted according to the configuration information.

In step 230, channel state information (CSI) is received, the CSI including a precoding matrix indicator, where a precoding matrix is determined according to set vectors, the set vector includes a first group of vectors, the first group of vectors includes L first vectors, each first vector corresponds to a port of the CSI-RS, and L is a positive integer.

In this embodiment, the network side receives the CSI reported by the terminal side, based on the vector composition of the precoding matrix and the relationship between vectors and CSI resource ports, which improves the accuracy of the CSI report. On this basis, the precoding matrix is represented by a matrix of the first group of vectors and a matrix of first coefficients, thus complexity is low and further, resource overhead is small.

In an embodiment, the set vectors further includes a second group of vectors, the second group of vectors includes $M_v$ second vectors, each element in each second vector corresponds to a precoding matrix, and $M_v$ is a positive integer.

In an embodiment, the method further includes:

step 240: determining whether to receive bit mapping information according to a rank of the precoding matrix, where the bit mapping information is used to indicate, in a non-zero bit, reported coefficients in first coefficients, the first coefficients include coefficients used to combine the set vectors as a precoding matrix.

In an embodiment, the method further includes:

step 242: determining whether to receive bit mapping information according to $M_v$, where the bit mapping information is used to indicate, in a non-zero bit, reported coefficients in first coefficients, the first coefficients include coefficients used to combine the set vectors as a precoding matrix.

In an embodiment, the method further includes:

step 250: determining a number of reported coefficients in first coefficients according to a rank of the precoding matrix, where the first coefficients include coefficients used to combine the set vectors as a precoding matrix.

In an embodiment, the method further includes:

step 252: determining a number of reported coefficients in first coefficients according to $M_v$, where the first coefficients include coefficients used to combine the set vectors as a precoding matrix.

In an embodiment, the method further includes:

step 260: determining L according to a number of reported coefficients in first coefficients, where the first coefficients include coefficients used to combine the set vectors as a precoding matrix.

In an embodiment, the method further includes:

step 262: determining L according to a rank of the precoding matrix.

In an embodiment, the configuration information includes a CSI-RS resource, and a number of antenna ports of the CSI-RS resource is P;

the method further includes: receiving a report of 2L antenna ports in P antenna ports;

the 2L antenna ports are mapped to L first vectors.

In an embodiment, L is determined according to one of:

a rank of the precoding matrix; $M_v$; the rank of the precoding matrix and $M_v$.

In an embodiment, overhead occupied by reporting a number of reported coefficients in first coefficients is $\lceil \log_2(4L) \rceil$ bits or $2+\lceil \log_2(L) \rceil$ bits, where the first coefficients include coefficients used to combine the set vectors as a precoding matrix.

In an embodiment, for first coefficients forming one layer of the precoding matrix, a number of reported coefficients does not exceed $K_0$;

for first coefficients forming various layers of the precoding matrix, a number of reported coefficients does not exceed 2 $K_0$;

where $K_0=\lceil 2LM_v\beta \rceil$, β is a positive number less than or equal to 1.

In an embodiment, the configuration information includes L, $M_v$, and β;

L, $M_v$, and β meet one of the associated relationships of:

corresponding to $M_v$ being 1, β being 1;

corresponding to $M_v$ being 1, β being 1, and corresponding to $M_v$ being greater than 1, β being less than 1;

corresponding to $M_v$ being 1, β being 1, and corresponding to $M_v$ being greater than 1, § being less than or equal to 1;

corresponding to $M_v$ being greater than 1, a value of β being determined according to L;

corresponding to $M_v$ being greater than 1, if a value of L being greater, then a value of β being smaller, and if a value of L being smaller, then a value of β being greater;

corresponding to $M_v$ being greater than 1, candidate values of L being divided into multiple sets according to candidate values of β, where elements of different sets are different;

corresponding to $M_v$ being greater than 1, each candidate value of L corresponding to one candidate value of β;

corresponding to $M_v$ being greater than 1, a candidate value of β and a candidate value of L meeting one of: corresponding to L=8, β=½, corresponding to L=6, β=½, corresponding to L=4, 6=¾, corresponding to L=2, β=¾, corresponding to L=1, β=¾;

candidate values of L being divided into a first set of candidate values of L and a second set of candidate values of L, candidate values of β forming a first set of candidate values of β and a second set of candidate values of β, the first set of candidate values of β corresponding to the first set of candidate values of L, the second set of candidate values of β corresponding to the second set of candidate values of L, where the first set of candidate values of β is different from the second set of candidate values of β;

candidate values of L being divided into a first set of candidate values of L and a second set of candidate values of L, candidate values of β forming a first set of candidate values of β and a second set of candidate values of 3, the first set of candidate values of β corresponding to the first set of candidate values of L, the second set of candidate values of β corresponding to the second set of candidate values of L, where the first set of candidate values of β is a subset of the second set of candidate values of β, and the first set of candidate values of β is different from the second set of candidate values of β;

corresponding to L being 16, β being 1;

corresponding to L being 12, β being 1;

candidate values of $M_v$ being divided into a first set of candidate values of $M_v$ and a second set of candidate values of $M_v$, candidate values of β being divided into a first set of candidate values of β and a second set of candidate values of β, the first set of candidate values of β corresponding to the first set of candidate values of $M_v$, the second set of candidate values of β corresponding to the second set of candidate values of $M_v$;

candidate values of $M_v$ being divided into a first set of candidate values of $M_v$ and a second set of candidate values of $M_v$, candidate values of β forming a first set of candidate values of β and a second set of candidate values of β, the first set of candidate values of β corresponding to the first set of candidate values of $M_v$, the second set of candidate values of β corresponding to the second set of candidate values of $M_v$, where the first set of candidate values of β is different from the second set of candidate values of β;

candidate values of $M_v$ being divided into a first set of candidate values of $M_v$ and a second set of candidate values of $M_v$, candidate values of β being divided into a first set of candidate values of β and a second set of candidate values of β, the first set of candidate values of β corresponding to the first set of candidate values of $M_v$, the second set of candidate values of β corresponding to the second set of candidate values of $M_v$, where the first set of candidate values of β is a subset of the second set of candidate values of β, and the first set of candidate values of β is different from the second set of candidate values of β;

candidate values of $M_v$ being divided into a first set of candidate values of $M_v$ and a second set of candidate values of $M_v$, candidate values of L being divided into a first set of candidate values of L and a second set of candidate values of L, the first set of candidate values of L corresponding to the first set of candidate values of $M_v$, the second set of candidate values of L corresponding to the second set of candidate values of $M_v$;

candidate values of $M_v$ being divided into a first set of candidate values of $M_v$ and a second set of candidate values of $M_v$, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is different from the second set of candidate values of L;

candidate values of $M_v$ being divided into a first set of candidate values of $M_v$ and a second set of candidate values of L, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is a subset of the second set of candidate values of L, and the first set of candidate values of L is different from the second set of candidate values of L;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is different from the second set of candidate values of $M_v$;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is a subset of the second set of candidate values of $M_v$, and the first set of candidate values of $M_v$ is different from the second set of candidate values of $M_v$;

corresponding to L being 16, $M_v$ being 1;

corresponding to L being 12, $M_v$ being 1.

In an embodiment, the configuration information includes P and $M_v$, where P is a number of antenna ports of a CSI-RS resource;

P and $M_v$ meet one of the associated relationships of:

corresponding to P being greater than or equal to a first threshold value, $M_v$ being less than or equal to a second threshold value, and corresponding to P being less than the first threshold value, $M_v$ greater than being the second threshold value;

corresponding to P being greater than a first threshold value, $M_v$ being less than a second threshold value, and corresponding to P being less than or equal to the first threshold value, $M_v$ being greater than or equal to the second threshold value;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P and the second set of candidate values of P respectively, the second set of candidate values of $M_v$ corresponding to the second set of candidate values of P;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is different from the second set of candidate values of $M_v$;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is a subset of the second set of candidate values of $M_v$, and the first set of candidate values of $M_v$ is different from the second set of candidate values of $M_v$;

corresponding to P being 32, $M_v$ being 1;

corresponding to P being 24, $M_v$ being 1.

In an embodiment, the configuration information includes P and β, where P is a number of antenna ports of a CSI-RS resource;

P and β meet one of the associated relationships of:

corresponding to P being greater than or equal to a first threshold value, β being greater than or equal to a second threshold value, and corresponding to P being less than the first threshold value, β being less than the second threshold value;

corresponding to P being greater than a first threshold value, β being greater than a second threshold value, and corresponding to P being less than or equal to the first threshold value, β being less than or equal to the second threshold value;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P, the second set of candidate values of β corresponding to the second set of candidate values of P;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P and the second set of candidate values of P respectively, the second set of candidate values of β corresponding to the second set of candidate values of P;

candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is different from the second set of candidate values of β;

candidate values of P being divided into a first set of candidate values of P and a second set of candidate values of P, candidate values of B forming a first set of candidate values of β and a second set of candidate values of β, the first set of candidate values of β corresponding to the first set of candidate values of P, the second set of candidate values of β corresponding to the second set of candidate values of P, where the first set of candidate values of β is a subset of the second set of candidate values of β, and the first set of candidate values of β is different from the second set of candidate values of β;

corresponding to P being 32, β being 1;

corresponding to P being 24, β being 1.

In an embodiment, the configuration information includes a combination parameter C, the combination parameter C is used to indicate L, $M_v$, and β;

P, C, L, $M_v$, and β meet one of the associated relationships of:

L, $M_v$ and β indicated by the combination parameter being determined according to P;

a value range of the combination parameter being determined according to P;

a value of L increasing with increasing of a value of the combination parameter;

candidate values of P being divided into a first set of candidate values of P and a second set of candidate values of P; corresponding to the first set of candidate values of P, a value of the combination parameter C indicating a first combination of a value of L, a value of $M_v$, and a value of β, and corresponding to the second set of candidate values of P, a value of the combination parameter C indicating a second combination of a value of L, a value of $M_v$, and a value of β, the first combination being different from the second combination;

candidate values of P being divided into a first set of candidate values of P and a second set of candidate values of P, candidate values of C being divided into a first set of candidate values of C and a second set of candidate values of C, the first set of candidate values of C corresponding to the first set of candidate values of P, the second set of candidate values of C corresponding to the second set of candidate values of P, the first set of candidate values of C being different from the second set of candidate values of C.

The embodiments of the present disclosure further provide a channel state information reporting apparatus. FIG. 3 is a structural schematic diagram of a channel state information reporting apparatus provided by an embodiment. As shown in FIG. 3, the channel state information reporting apparatus includes:

an information receiving module 310, configured to receive configuration information;

a signal receiving module 320, configured to receive a CSI-RS according to the configuration information; and a reporting module 330, configured to report CSI according to the CSI-RS, the CSI including a precoding matrix indicator, where a precoding matrix is determined according to set vectors, the set vectors includes a first group of vectors, the first group of vectors includes L first vectors, each first vector corresponds to a port of the CSI-RS, and L is a positive integer.

The channel state information reporting apparatus of this embodiment reports the CSI to the network side, based on the vector composition of the precoding matrix and the relationship between vectors and CSI resource ports, which improves the accuracy of the CSI report. On this basis, the precoding matrix is represented by a matrix of the first group of vectors and a matrix of first coefficients, thus complexity is low and further, resource overhead is small.

In an embodiment, the set vectors further includes a second group of vectors, the second group of vectors includes $M_v$ second vectors, each element in each second vector corresponds to a precoding matrix, and $M_v$ is a positive integer.

In an embodiment, the apparatus further includes:

a bit mapping reporting module, configured to determine whether to report bit mapping information according to a rank of the precoding matrix;

where the bit mapping information is used to indicate, in a non-zero bit, reported coefficients in first coefficients, the first coefficients include coefficients used to combine the set vectors as a precoding matrix.

In an embodiment, the apparatus further includes:

report deciding module, configured to determine whether to report bit mapping information according to $M_v$;

where the bit mapping information is used to indicate, in a non-zero bit, reported coefficients in first coefficients, the first coefficients include coefficients used to combine the set vectors as a precoding matrix.

In an embodiment, the apparatus further includes:

a first number determining module, configured to determine a number of reported coefficients in first coefficients according to a rank of the precoding matrix, where the first coefficients include coefficients used to combine the set vectors as a precoding matrix.

In an embodiment, the apparatus further includes:

a second number determining module, configured to determine a number of reported coefficients in first coefficients according to $M_v$, where the first coefficients include coefficients used to combine the set vector as a precoding matrix.

In an embodiment, the apparatus further includes:

a first vector number determining module, configured to determine L according to a number of reported coefficients in first coefficients, where the first coefficients include coefficients used to combine the set vectors as a precoding matrix.

In an embodiment, the apparatus further includes:

a second vector number determining module, configured to determine L according to a rank of the precoding matrix.

In an embodiment, the configuration information includes a CSI-RS resource, and a number of antenna ports of the CSI-RS resource is P;

the apparatus further includes: an antenna port reporting module configured to select 2L antenna ports from P antenna ports and report the 2L antenna ports;

the 2L antenna ports are mapped to L first vectors.

In an embodiment, L is determined according to one of:

a rank of the precoding matrix; $M_v$; the rank of the precoding matrix and $M_v$.

In an embodiment, overhead occupied by reporting a number of reported coefficients in first coefficients is $\lceil \log_2(4L) \rceil$ bits or $2+\lceil \log_2(L) \rceil$ bits, where the first coefficients include coefficients used to combine the set vectors as a precoding matrix.

In an embodiment, for first coefficients forming one layer of the precoding matrix, a number of reported coefficients does not exceed $K_0$;

for first coefficients forming various layers of the precoding matrix, a number of reported coefficients does not exceed 2 $K_0$;

where $K_0=\lceil 2LM_v\beta \rceil$, β is a positive number less than or equal to 1.

In an embodiment, the configuration information includes L, $M_v$, and β;

L, $M_v$, and β meet one of the associated relationships of:

corresponding to $M_v$ being 1, β being 1;

corresponding to $M_v$ being 1, ϵ being 1, and corresponding to $M_v$ being greater than 1, 6 being less than 1;

corresponding to $M_v$ being 1, β being 1, and corresponding to $M_v$ being greater than 1, 6 being less than or equal to 1;

corresponding to $M_v$ being greater than 1, a value of β being determined according to L;

corresponding to $M_v$ being greater than 1, if a value of L being greater, then a value of β being smaller, and if a value of L being smaller, then a value of β being greater;

corresponding to $M_v$ being greater than 1, candidate values of L being divided into multiple sets according to candidate values of β, where elements of different sets are different;

corresponding to $M_v$ being greater than 1, each candidate value of L corresponding to one candidate value of β;

corresponding to $M_v$ being greater than 1, a candidate value of β and a candidate value of L meeting one of: corresponding to L=8, β=½, corresponding to L=6, β=½, corresponding to L=4, β=¾, corresponding to L=2, β=¾, corresponding to L=1, β=¾;

candidate values of L being divided into a first set of candidate values of L and a second set of candidate values of L, candidate values of β forming a first set of candidate values of β and a second set of candidate values of β, the first set of candidate values of β corresponding to the first set of candidate values of L, the second set of candidate values of β corresponding to the second set of candidate values of L, where the first set of candidate values of β is different from the second set of candidate values of β;

candidate values of L being divided into a first set of candidate values of L and a second set of candidate values of L, candidate values of β forming a first set of candidate values of β and a second set of candidate values of β, the first set of candidate values of β corresponding to the first set of candidate values of L, the second set of candidate values of β corresponding to the second set of candidate values of L, where the first set of candidate values of β is a subset of the second set of candidate values of β, and the first set of candidate values of β is different from the second set of candidate values of β;

corresponding to L being 16, β being 1;

corresponding to L being 12, β being 1;

candidate values of $M_v$ being divided into a first set of candidate values of $M_v$ and a second set of candidate values of $M_v$, candidate values of β being divided into a first set of candidate values of β and a second set of candidate values of β, the first set of candidate values of β corresponding to the first set of candidate values of $M_v$, the second set of candidate values of β corresponding to the second set of candidate values of $M_v$;

candidate values of $M_v$ being divided into a first set of candidate values of $M_v$ and a second set of candidate values of $M_v$, candidate values of β forming a first set of candidate values of β and a second set of candidate values of β, the first set of candidate values of β corresponding to the first set of candidate values of $M_v$, the second set of candidate values of β corresponding to the second set of candidate values of $M_v$, where the first set of candidate values of β is different from the second set of candidate values of β;

candidate values of $M_v$ being divided into a first set of candidate values of $M_v$ and a second set of candidate values of $M_v$, candidate values of β forming a first set of candidate values of β and a second set of candidate values of β, the first set of candidate values of § corresponding to the first set of candidate values of $M_v$, the second set of candidate values of β corresponding to the second set of candidate values of $M_v$, where the first set of candidate values of β is a subset of the second set of candidate values of β, and the first set of candidate values of β is different from the second set of candidate values of β;

candidate values of $M_v$ being divided into a first set of candidate values of $M_v$ and a second set of candidate values of $M_v$, candidate values of L being divided into a first set of candidate values of L and a second set of candidate values of L, the first set of candidate values of L corresponding to the first set of candidate values of $M_v$, the second set of candidate values of L corresponding to the second set of candidate values of $M_v$;

candidate values of $M_v$ being divided into a first set of candidate values of $M_v$ and a second set of candidate values of $M_v$, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is different from the second set of candidate values of L;

candidate values of $M_v$ being divided into a first set of candidate values of $M_v$ and a second set of candidate values of L, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is a subset of the second set of candidate values of L, and the first set of candidate values of L is different from the second set of candidate values of L;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is different from the second set of candidate values of $M_v$;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is a subset of the second set of candidate values of $M_v$, and the first set of candidate values of $M_v$ is different from the second set of candidate values of $M_v$;

corresponding to L being 16, $M_v$ being 1;

corresponding to L being 12, $M_v$ being 1.

In an embodiment, the configuration information includes P and $M_v$, where P is a number of antenna ports of a CSI-RS resource;

P and $M_v$ meet one of the associated relationships of:

corresponding to P being greater than or equal to a first threshold value, $M_v$ being less than or equal to a second threshold value, and corresponding to P being less than the first threshold value, $M_v$ greater than being the second threshold value;

corresponding to P being greater than a first threshold value, $M_v$ being less than a second threshold value, and corresponding to P being less than or equal to the first threshold value, $M_v$ being greater than or equal to the second threshold value;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P and the second set of candidate values of P respectively, the second set of candidate values of $M_v$ corresponding to the second set of candidate values of P;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is different from the second set of candidate values of $M_v$;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is a subset of the second set of candidate values of $M_v$, and the first set of candidate values of $M_v$ is different from the second set of candidate values of $M_v$;

corresponding to P being 32, $M_v$ being 1;

corresponding to P being 24, $M_v$ being 1.

In an embodiment, the configuration information includes P and β, where P is a number of antenna ports of a CSI-RS resource;

P and β meet one of the associated relationships of:

corresponding to P being greater than or equal to a first threshold value, B being greater than or equal to a second threshold value, and corresponding to P being less than the first threshold value, β being less than the second threshold value;

corresponding to P being greater than a first threshold value, β being greater than a second threshold value, and corresponding to P being less than or equal to the first threshold value, β being less than or equal to the second threshold value;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P, the second set of candidate values of β corresponding to the second set of candidate values of P;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P and the second set of candidate values of P respectively, the second set of candidate values of β corresponding to the second set of candidate values of P;

candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is different from the second set of candidate values of β;

candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is a subset of the second set of candidate values of β, and the first set of candidate values of β is different from the second set of candidate values of β;

corresponding to P being 32, β being 1; corresponding to P being 24, β being 1.

In an embodiment, the configuration information includes a combination parameter C, the combination parameter C is used to indicate L, $M_v$, and β;

P, C, L, $M_v$, and β meet one of the associated relationships of: L, $M_v$ and β indicated by the combination parameter being determined according to P; a value range of the combination parameter being determined according to P; a value of L increasing with increasing of a value of the combination parameter;

candidate values of P being divided into a first set of candidate values of P and a second set of candidate values of P; corresponding to the first set of candidate values of P, a value of the combination parameter C indicating a first combination of a value of L, a value of $M_v$, and a value of β, and corresponding to the second set of candidate values of P, a value of the combination parameter C indicating a second combination of a value of L, a value of $M_v$, and a value of β, the first combination being different from the second combination;

candidate values of P being divided into a first set of candidate values of P and a second set of candidate values of P, candidate values of C forming a first set of candidate values of C and a second set of candidate values of C, the first set of candidate values of C corresponding to the first set of candidate values of P, the second set of candidate values of C corresponding to the second set of candidate values of P, the first set of candidate values of C being different from the second set of candidate values of C.

The channel state information reporting apparatus proposed in this embodiment belongs to the same inventive conception as the channel state information reporting method proposed in the above embodiments, and the technical details not fully described in this embodiment may refer to any of the above embodiments, and this embodiment has the same beneficial effect as performing the channel state information reporting method.

Figure 4:
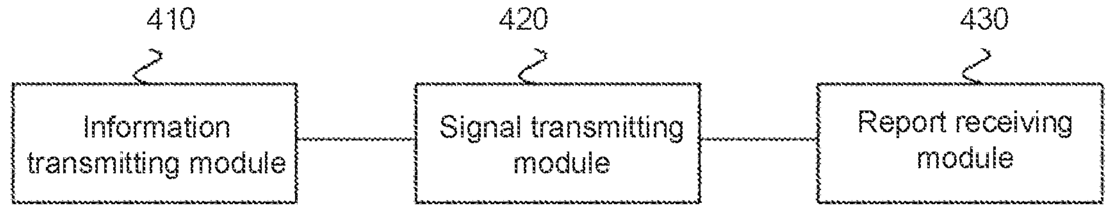
FIG. 4 is a structural schematic diagram of a channel state information receiving apparatus provided by an embodiment.

The embodiments of the present disclosure further provide a channel state information receiving apparatus. FIG. 4 is a structural schematic diagram of a channel state information receiving apparatus provided by an embodiment. As shown in FIG. 4, the channel state information receiving apparatus includes:

an information transmitting module 410, configured to transmit configuration information;

a signal transmitting module 420, configured to transmit a CSI-RS according to the configuration information;

a report receiving module 430, configured to receive CSI, where the CSI includes a precoding matrix indicator, where a precoding matrix is determined according to set vectors, the set vectors includes a first group of vectors, the first group of vectors includes L first vectors, each first vector corresponds to a port of the CSI-RS, and L is a positive integer.

The channel state information receiving apparatus of this embodiment receives the CSI reported by the terminal side, based on the vector composition of the precoding matrix and the relationship between vectors and CSI resource ports, which improves the accuracy of the CSI report. On this basis, the precoding matrix is represented by a matrix of the first group of vectors and a matrix of first coefficients, thus complexity is low and further, resource overhead is small.

In an embodiment, the set vectors further includes a second group of vectors, the second group of vectors includes $M_v$ second vectors, each element in each second vector corresponds to a precoding matrix, and $M_v$ is a positive integer.

In an embodiment, the apparatus further includes:

a bit mapping receiving module, configured to determine whether to receive bit mapping information according to a rank of the precoding matrix, where the bit mapping information is used to indicate, in a non-zero bit, reported coefficients in first coefficients, the first coefficients include coefficients used to combine the set vectors as a precoding matrix.

In an embodiment, the apparatus further includes:

a receiving decision module, configured to determine whether to receive bit mapping information according to $M_v$, where the bit mapping information is used to indicate, in a non-zero bit, reported coefficients in first coefficients, the first coefficients include coefficients used to combine the set vectors as a precoding matrix.

In an embodiment, the apparatus further includes:

a third number determining module, configured to determine a number of reported coefficients in first coefficients according to a rank of the precoding matrix, where the first coefficients include coefficients used to combine the set vectors as a precoding matrix.

In an embodiment, the apparatus further includes:

a fourth number determining module, configured to determine a number of reported coefficients in first coefficients according to $M_v$, where the first coefficients include coefficients used to combine the set vectors as a precoding matrix.

In an embodiment, the apparatus further includes:

a third vector number determining module, configured to determine L according to a number of reported coefficients in first coefficients, where the first coefficients include coefficients used to combine the set vectors as a precoding matrix.

In an embodiment, the apparatus further includes:

a fourth vector number determining module, configured to determine L according to a rank of the precoding matrix.

In an embodiment, the configuration information includes a CSI-RS resource, and a number of antenna ports of the CSI-RS resource is P;

the apparatus further includes: an antenna port receiving module, configured to receive a report of 2L antenna ports in P antenna ports, where the 2L antenna ports are mapped to the L first vectors.

In an embodiment, L is determined according to one of: a rank of the precoding matrix; $M_v$; the rank of the precoding matrix and $M_v$.

In an embodiment, overhead occupied by reporting a number of reported coefficients in first coefficients is $\lceil \log_2(4L) \rceil$ bits or $2+\lceil \log_2(L) \rceil$ bits, where the first coefficients include coefficients used to combine the set vectors as a precoding matrix.

In an embodiment, for first coefficients forming one layer of the precoding matrix, a number of reported coefficients does not exceed $K_0$;

for first coefficients forming various layers of the precoding matrix, a number of reported coefficients does not exceed 2 $K_0$;

where $K_0=\lceil 2LM_v\beta \rceil$, β is a positive number less than or equal to 1.

In an embodiment, the configuration information includes L, $M_v$, and β;

L, $M_v$, and β meet one of the associated relationships of: corresponding to $M_v$ being 1, β being 1;

corresponding to $M_v$ being 1, § being 1, and corresponding to $M_v$ being greater than 1, β being less than 1;

corresponding to $M_v$ being 1, β being 1, and corresponding to $M_v$ being greater than 1, β being less than or equal to 1;

corresponding to $M_v$ being greater than 1, a value of β being determined according to L;

corresponding to $M_v$ being greater than 1, if a value of L being greater, then a value of β being smaller, and if a value of L being smaller, then a value of β being greater;

corresponding to $M_v$ being greater than 1, candidate values of L being divided into multiple sets according to candidate values of β, where elements of different sets are different;

corresponding to $M_v$ being greater than 1, each candidate value of L corresponding to one candidate value of β;

corresponding to $M_v$ being greater than 1, a candidate value of β and a candidate value of L meeting one of: corresponding to L=8, β=½, corresponding to L=6, β=½, corresponding to L=4, β=¾, corresponding to L=2, 3=¾, corresponding to L=1, β=¾;

candidate values of L being divided into a first set of candidate values of L and a second set of candidate values of L, candidate values of β forming a first set of candidate values of β and a second set of candidate values of β, the first set of candidate values of β corresponding to the first set of candidate values of L, the second set of candidate values of β corresponding to the second set of candidate values of L, where the first set of candidate values of β is different from the second set of candidate values of β;

candidate values of L being divided into a first set of candidate values of L and a second set of candidate values of L, candidate values of β forming a first set of candidate values of β and a second set of candidate values of β, the first set of candidate values of β corresponding to the first set of candidate values of L, the second set of candidate values of β corresponding to the second set of candidate values of L, where the first set of candidate values of β is a subset of the second set of candidate values of β, and the first set of candidate values of β is different from the second set of candidate values of 3;

corresponding to L being 16, β being 1; corresponding to L being 12, β being 1;

candidate values of $M_v$ being divided into a first set of candidate values of $M_v$ and a second set of candidate values of $M_v$, candidate values of β being divided into a first set of candidate values of β and a second set of candidate values of β, the first set of candidate values of β corresponding to the first set of candidate values of $M_v$, the second set of candidate values of β corresponding to the second set of candidate values of $M_v$;

candidate values of $M_v$ being divided into a first set of candidate values of $M_v$ and a second set of candidate values of $M_v$, candidate values of β forming a first set of candidate values of β and a second set of candidate values of β, the first set of candidate values of β corresponding to the first set of candidate values of $M_v$, the second set of candidate values of β corresponding to the second set of candidate values of $M_v$, where the first set of candidate values of β is different from the second set of candidate values of β;

candidate values of $M_v$ being divided into a first set of candidate values of $M_v$ and a second set of candidate values of $M_v$, candidate values of β being divided into a first set of candidate values of β and a second set of candidate values of β, the first set of candidate values of β corresponding to the first set of candidate values of $M_v$, the second set of candidate values of β corresponding to the second set of candidate values of $M_v$, where the first set of candidate values of β is a subset of the second set of candidate values of β, and the first set of candidate values of β is different from the second set of candidate values of β;

candidate values of $M_v$ being divided into a first set of candidate values of $M_v$ and a second set of candidate values of $M_v$, candidate values of L being divided into a first set of candidate values of L and a second set of candidate values of L, the first set of candidate values of L corresponding to the first set of candidate values of $M_v$, the second set of candidate values of L corresponding to the second set of candidate values of $M_v$;

candidate values of $M_v$ being divided into a first set of candidate values of $M_v$ and a second set of candidate values of $M_v$, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is different from the second set of candidate values of L;

candidate values of $M_v$ being divided into a first set of candidate values of $M_v$ and a second set of candidate values of L, candidate values of L forming a first set of candidate values of L and a second set of candidate values of L, the first set of candidate values of L corresponding to the first set of candidate values of $M_v$, the second set of candidate values of L corresponding to the second set of candidate values of $M_v$, where the first set of candidate values of L is a subset of the second set of candidate values of L, and the first set of candidate values of L is different from the second set of candidate values of L;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is different from the second set of candidate values of $M_v$;

candidate values of L being divided into a first set of candidate values of L and a second set of candidate values of L, candidate values of $M_v$ forming a first set of candidate values of $M_v$ and a second set of candidate values of $M_v$, the first set of candidate values of $M_v$ corresponding to the first set of candidate values of L, the second set of candidate values of $M_v$ corresponding to the second set of candidate values of L, where the first set of candidate values of $M_v$ is a subset of the second set of candidate values of $M_v$, and the first set of candidate values of $M_v$ is different from the second set of candidate values of $M_v$;

corresponding to L being 16, $M_v$ being 1; corresponding to L being 12, $M_v$ being 1.

In an embodiment, the configuration information includes P and $M_v$, where P is a number of antenna ports of a CSI-RS resource;

P and $M_v$ meet one of the associated relationships of:

corresponding to P being greater than or equal to a first threshold value, $M_v$ being less than or equal to a second threshold value, and corresponding to P being less than the first threshold value, $M_v$ greater than being the second threshold value;

corresponding to P being greater than a first threshold value, $M_v$ being less than a second threshold value, and corresponding to P being less than or equal to the first threshold value, $M_v$ being greater than or equal to the second threshold value;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P;

candidate values of P being divided into a first set of candidate values of P and a second set of candidate values of P, candidate values of $M_v$ being divided into a first set of candidate values of $M_v$ and a second set of candidate values of $M_v$, the first set of candidate values of $M_v$ corresponding to the first set of candidate values of P and the second set of candidate values of P respectively, the second set of candidate values of $M_v$ corresponding to the second set of candidate values of P;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is different from the second set of candidate values of $M_v$;

candidate values of P being divided into a first set of candidate values of P and a second set of candidate values of P, candidate values of $M_v$ forming a first set of candidate values of $M_v$ and a second set of candidate values of $M_v$, the first set of candidate values of $M_v$ corresponding to the first set of candidate values of P, the second set of candidate values of $M_v$ corresponding to the second set of candidate values of P, where the first set of candidate values of $M_v$ is a subset of the second set of candidate values of $M_v$, and the first set of candidate values of $M_v$ is different from the second set of candidate values of $M_v$;

corresponding to P being 32, $M_v$ being 1; corresponding to P being 24, $M_v$ being 1.

In an embodiment, the configuration information includes P and β, where P is a number of antenna ports of a CSI-RS resource;

P and β meet one of the associated relationships of:

corresponding to P being greater than or equal to a first threshold value, B being greater than or equal to a second threshold value, and corresponding to P being less than the first threshold value, β being less than the second threshold value;

corresponding to P being greater than a first threshold value, β being greater than a second threshold value, and corresponding to P being less than or equal to the first threshold value, β being less than or equal to the second threshold value;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P, the second set of candidate values of β corresponding to the second set of candidate values of P;

candidate values of P being divided into a first set of candidate values of P and a second set of candidate values of P, candidate values of β being divided into a first set of candidate values of β and a second set of candidate values of β, the first set of candidate values of β corresponding to the first set of candidate values of P and the second set of candidate values of P respectively, the second set of candidate values of β corresponding to the second set of candidate values of P;

candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is different from the second set of candidate values of β;

candidate values of P being divided into a first set of candidate values of P and a second set of candidate values of P, candidate values of β forming a first set of candidate values of β and a second set of candidate values of β, the first set of candidate values of β corresponding to the first set of candidate values of P, the second set of candidate values of β corresponding to the second set of candidate values of P, where the first set of candidate values of β is a subset of the second set of candidate values of β, and the first set of candidate values of β is different from the second set of candidate values of β;

corresponding to P being 32, β being 1; corresponding to P being 24, β being 1.

In an embodiment, the configuration information includes a combination parameter C, the combination parameter C is used to indicate L, $M_\nu$, and β;

P, C, L, $M_\nu$, and β meet one of the associated relationships of: L, $M_\nu$ and β indicated by the combination parameter being determined according to P; a value range of the combination parameter being determined according to P; a value of L increasing with increasing of a value of the combination parameter;

candidate values of P being divided into a first set of candidate values of P and a second set of candidate values of P; corresponding to the first set of candidate values of P, a value of the combination parameter C indicating a first combination of a value of L, a value of $M_\nu$, and a value of β, and corresponding to the second set of candidate values of P, a value of the combination parameter C indicating a second combination of a value of L, a value of $M_\nu$, and a value of, the first combination being different from the second combination;

candidate values of P being divided into a first set of candidate values of P and a second set of candidate values of P, candidate values of C being divided into a first set of candidate values of C and a second set of candidate values of C, the first set of candidate values of C corresponding to the first set of candidate values of P, the second set of candidate values of C corresponding to the second set of candidate values of P, the first set of candidate values of C being different from the second set of candidate values of C.

The channel state information receiving apparatus proposed in this embodiment belongs to the same inventive conception as the channel state information receiving method proposed in the above embodiments, and the technical details not fully described in this embodiment may refer to any of the above embodiments, and this embodiment has the same beneficial effect as performing the channel state information receiving method.

Figure 5:
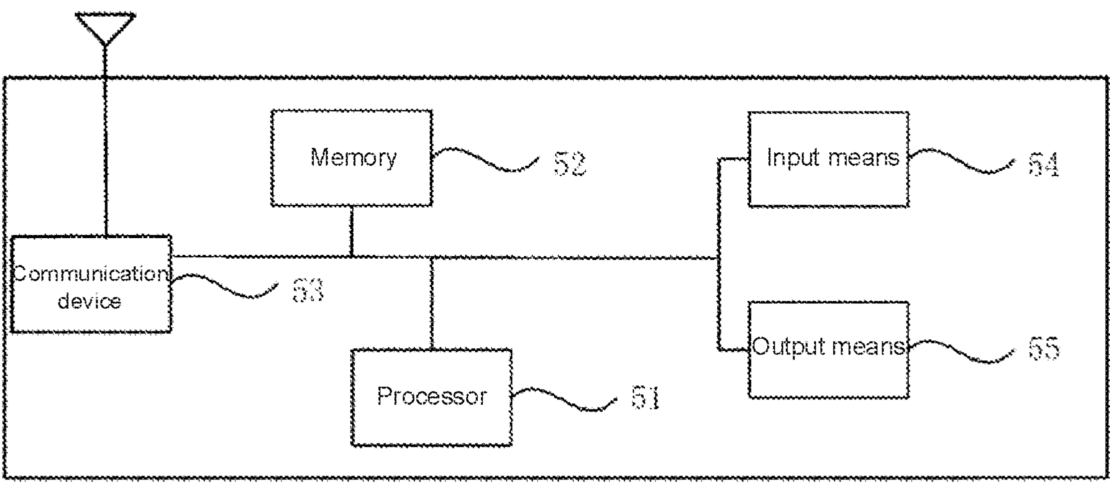
FIG. 5 is a structural schematic diagram of a communication node provided by an embodiment.

The embodiments of the present disclosure further provide a communication node. FIG. 5 is a hardware structural schematic diagram of a communication node provided by an embodiment. As shown in FIG. 5, the communication node provided in the present disclosure, includes a memory 52, a processor 51, and a computer program stored on the memory and runnable on the processor, and the processor 51, upon executing the program, implements the above channel state information reporting method.

The communication node may further include the memory 52; the processor 51 in the communication node may be one or more, one processor 51 is taken as an example in FIG. 5; the memory 52 is used to store one or more programs; the one or more programs are executed by the one or more processors 51, such that the one or more processors 51 implements the channel state information reporting method or the channel state information receiving method as described in the embodiments of the present disclosure.

The communication node further include: a communication means 53, an input means 54, and an output means 55.

The processor 51, the memory 52, the communication means 53, the input means 54 and the output means 55 in the communication node may be connected by a bus or in other ways, and the connection by the bus is taken as an example in FIG. 5.

The input means 54 may be used to receive input number or character information, and generate key signal input related to a user setting and a function control of the communication node. The output means 55 may include a display means such as a display screen, etc.

The communication means 53 may include a receiver and a transmitter. The communication means 53 is configured to communicate information according to the control of the processor 51.

The memory 52, as a computer-readable storage medium, may be configured to store a software program, a computer-executable program, and a module, such as a program instruction/module (e.g., the information receiving module 310, the signal receiving module 320 and the reporting module 330 in the channel state information reporting apparatus) corresponding to the channel state information reporting method as described in the embodiments of the present disclosure. The memory 52 may include a storage program area and a storage data area, where the storage program area may store an operating system, an application program required for at least one function; and the storage data area may store data created according to the usage of the service node, and so on. Additionally, the memory 52 may include a high speed random access memory, and may further include a non-volatile memory, such as at least one magnetic disk storage means, a flash memory means, or other non-volatile solid state storage means. In some examples, the memory 52 may further include memories disposed remotely relative to the processor 51, and these remote memories may be connected to the communication node by a network. Examples of the above networks include, but are not limited to, the Internet, an intranet, a local area network, mobile communication networks and combinations thereof.

The embodiments of the present disclosure further provide a storage medium, having stored a computer program thereon, the computer program, upon being executed by a processor, implements the channel state information reporting method or the channel state information receiving method as described in any of the embodiments of the present disclosure.

The channel state information reporting method includes: receiving configuration information; receiving a CSI-RS according to the configuration information; and reporting CSI according to the CSI-RS, the CSI including a precoding matrix indicator, where a precoding matrix is determined according to set vectors, the set vectors includes a first group of vectors, the first group of vectors includes L first vectors, each first vector corresponds to a port of the CSI-RS, and L is a positive integer.

The channel state information receiving method includes: transmitting configuration information; transmitting a CSI-RS according to the configuration information; and receiving CSI, the CSI including a precoding matrix indicator, where a precoding matrix is determined according to set vectors, the set vectors includes a first group of vectors, the first group of vectors includes L first vectors, each first vector corresponds to a port of the CSI-RS, and L is a positive integer.

The computer storage medium in the embodiments of the present disclosure may adopt any combination of one or more computer readable media. The computer readable medium may be a computer readable signal medium or a computer readable storage medium. A computer readable storage medium may be, for example, but not limited to, an electrical, magnetic, optical, electromagnetic, infrared, or semiconductor system, apparatus or means, or any combination thereof. More specific examples (a non-exhaustive list) of a computer readable storage medium include: an electrical connection with one or more wires, a portable computer magnetic disk, a hard disk, a random access memory (RAM), a read-only memory (ROM), an erasable programmable read-only memory (EPROM), a flash memory, an optical fiber, a portable CD-ROM, an optical storage means, a magnetic storage means, or any suitable combination of the above. A computer readable storage medium may be any tangible medium that contains or stores a program which is used by or in combination with, an instruction executing system, an apparatus, or a means.

A computer readable signal medium may include a data signal, which is propagated in a baseband or as a part of a carrier wave, where a computer readable program code is carried. Such a propagated data signal may have many forms, including but not limited to: an electromagnetic signal, an optical signal, or any suitable combination of the above. A computer readable signal medium may also be any computer readable medium other than the computer readable storage medium, and the computer readable medium may send, propagate, or transmit the program which is used by or in combination with an instruction executing system, an apparatus, or a means.

A program code contained on the computer readable medium may be transmitted using any appropriate medium, including but not limited to: wireless, wire, optical cable, radio frequency (RF), etc., or any suitable combination of the above.

The computer program code for performing operations of the present disclosure may be written in one or more programming languages, or a combination thereof, including an object-oriented programming language-such as Java, Smalltalk, C++, and also including conventional procedural programming language-such as "C" language or a similar programming language. The program code may be executed entirely on a user's computer, partly on the user's computer, as a stand-alone software package, partly on the user's computer and partly on a remote computer, or entirely on the remote computer or a server. In a case where the remote computer is involved, the remote computer may be connected to the user's computer by any kind of network, including a local area network (LAN) or a wide area network (WAN), or may be connected to an external computer (e.g., connected by the Internet using an Internet service provider).

The foregoing is only the exemplary embodiments of the present disclosure and is not used to limit the scope of protection of the present disclosure. Those skilled in the art should understand that, the term "user terminal" covers any suitable type of wireless user equipment, for example, a mobile phone, a portable data processing apparatus, a portable web browser or a vehicle-mounted mobile station.

In general, many embodiments of the present disclosure may be implemented in a hardware or an application specific circuit, a software, a logic or any combination thereof. For example, some aspects may be implemented in the hardware, and other aspects may be implemented in the firmware or the software which may be executed by a controller, a microprocessor or other computing apparatuses, although the present disclosure is not limited herein.

The embodiments of the present disclosure may be implemented by a data processor of a mobile apparatus (e.g., in a processor entity, or by the hardware, or by a combination of the software and the hardware) executing the computer program instructions. The computer program instructions may be assembly instructions, instruction set architecture (ISA) instructions, machine instructions, machine-related instructions, microcodes, firmware instructions, state setting data, or source codes or object codes written in any combination of one or more programming languages.

The block diagrams of any logic flow in the drawings of the present disclosure may represent program steps, or may represent interconnected logic circuits, modules, and functions, or may represent a combination of program steps, and logic circuits, modules and functions. The computer program may be stored on the memory. The memory may be of any type suitable for the local technical environment and may be implemented by using any suitable data storage technology, for example, but is not limited to, a read-only memory (ROM), a random access memory (RAM), or an optical memory apparatus and system (Digital Video Disc (DVD) or Compact Disk (CD)), etc. The computer readable medium may include a non-transitory storage medium. The data processor may be of any type suitable for the local technical environment, for example, but not limited to, a general purpose computer, an application specific computer, a microprocessor, a digital signal processor (DSP), an application specific integrated circuit (ASIC), a field-programmable gate array (FPGA), and a processor based on a multi-core processor architecture.

By exemplary and non-limiting examples, the detailed description of exemplary embodiments of the present disclosure has been provided above. However, a variety of modifications and adjustments to the above embodiments are apparent to those skilled in the art when considered in conjunction with the drawings and claims, without departing from the scope of the present disclosure. Therefore, the proper scope of the present disclosure will be determined in accordance with the claims.

What is claimed is:

1. A channel state information reporting method, comprising:

receiving configuration information;

receiving a channel state information-reference signal (CSI-RS) according to the configuration information; and reporting channel state information (CSI) according to the CSI-RS, the CSI comprising a precoding matrix indicator for indicating a precoding matrix, wherein the precoding matrix is determined according to set vectors, the set vectors comprises a first group of vectors, the first group of vectors comprises L first vectors, each first vector of the L first vectors corresponds to a port of the CSI-RS, and L is a positive integer;

wherein the set vectors further comprises a second group of vectors, the second group of vectors comprises $M_v$ second vectors, each element in each second vector of the $M_v$ second vectors corresponds to a precoding matrix, and $M_v$ is a positive integer, the method further comprising:

determining whether to report bit mapping information according to $M_v$ and $K^{NZ}$;

wherein the bit mapping information is used to indicate, in a non-zero bit, reported coefficients in first coefficients, the first coefficients comprise coefficients used to combine the set vectors as a precoding matrix;

wherein $K^{NZ}$ is a number of coefficients reported to a network.

2. The method according to claim 1, further comprising:

determining whether to report the bit mapping information according to a rank of the precoding matrix.

3. The method according to claim 1, further comprising:

determining a number of reported coefficients in the first coefficients according to a rank of the precoding matrix and $M_v$.

4. The method according to claim 1, wherein the configuration information comprises a CSI-RS resource, and a number of antenna ports of the CSI-RS resource is P;

the method further comprises: selecting 2L antenna ports from P antenna ports and reporting the 2L antenna ports;

the 2L antenna ports are mapped to L first vectors.

5. A channel state information receiving method, comprising:

transmitting configuration information;

transmitting a channel state information-reference signal (CSI-RS) according to the configuration information; and receiving channel state information (CSI), the CSI comprising a precoding matrix indicator for indicating a precoding matrix, wherein the precoding matrix is determined according to set vectors, the set vectors comprises a first group of vectors, the first group of vectors comprises L first vectors, each first vector of the L first vectors corresponds to a port of the CSI-RS, and L is a positive integer;

wherein the set vectors further comprises a second group of vectors, the second group of vectors comprises $M_v$ second vectors, each element in each second vector of the $M_v$ second vectors corresponds to a precoding matrix, and $M_v$ is a positive integer.

6. The method according to claim 5, wherein the set vectors further comprises a second group of vectors, the second group of vectors comprises $M_v$ second vectors, each element in each second vector of the $M_v$ second vectors corresponds to a precoding matrix, and $M_v$ is a positive integer, for first coefficients forming one layer of the precoding matrix, a number of reported coefficients does not exceed $K_0$;

for first coefficients forming each layer of the precoding matrix, a number of reported coefficients does not exceed 2 $K_0$;

where $K_0=\lceil 2LM_v\beta \rceil$, β is a positive number less than or equal to 1.

7. A communication node, comprising a memory, a processor, and a computer program stored on the memory and runnable on the processor, wherein the processor, upon performing the program, implements the following steps:

receiving configuration information;

receiving a channel state information-reference signal (CSI-RS) according to the configuration information; and reporting channel state information (CSI) according to the CSI-RS, the CSI comprising a precoding matrix indicator for indicating a precoding matrix, wherein the precoding matrix is determined according to set vectors, the set vectors comprises a first group of vectors, the first group of vectors comprises L first vectors, each first vector of the L first vectors corresponds to a port of the CSI-RS, and L is a positive integer;

wherein the set vectors further comprises a second group of vectors, the second group of vectors comprises $M_v$ second vectors, each element in each second vector of the $M_v$ second vectors corresponds to a precoding matrix, and $M_v$ is a positive integer, the steps further comprising:

determining whether to report bit mapping information according to $M_v$ and $K^{NZ}$;

wherein the bit mapping information is used to indicate, in a non-zero bit, reported coefficients in first coefficients, the first coefficients comprise coefficients used to combine the set vectors as a precoding matrix;

wherein $K^{NZ}$ is a number of coefficients reported to a network.

8. The communication node according to claim 7, further comprising:

determining whether to report the bit mapping information according to a rank of the precoding matrix.

9. The communication node according to claim 7, further comprising:

determining a number of reported coefficients in the first coefficients according to a rank of the precoding matrix and $M_v$.

* * * * *